US012587040B2

(12) United States Patent
Lee et al.

(10) Patent No.: US 12,587,040 B2
(45) Date of Patent: Mar. 24, 2026

(54) METHOD AND APPARATUS FOR CONTROLLING POWER BETWEEN PLURALITY OF DEVICES THROUGH OUT-OF-BAND COMMUNICATION IN WIRELESS POWER TRANSMISSION SYSTEM

(71) Applicant: LG Electronics Inc., Seoul (KR)

(72) Inventors: Minsoo Lee, Seoul (KR); Gyunghwan Yook, Seoul (KR); Jinho Youn, Seoul (KR); Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 369 days.

(21) Appl. No.: 18/562,001

(22) PCT Filed: May 17, 2022

(86) PCT No.: PCT/KR2022/007068
§ 371 (c)(1),
(2) Date: Nov. 17, 2023

(87) PCT Pub. No.: WO2022/245112
PCT Pub. Date: Nov. 24, 2022

(65) Prior Publication Data
US 2024/0243618 A1      Jul. 18, 2024

(30) Foreign Application Priority Data

May 17, 2021      (KR) ......................... 10-2021-0063589

(51) Int. Cl.
*H04B 5/79*      (2024.01)
*H02J 50/40*      (2016.01)
*H02J 50/80*      (2016.01)

(52) U.S. Cl.
CPC .............. *H02J 50/80* (2016.02); *H02J 50/40* (2016.02)

(58) Field of Classification Search
CPC ........ H02J 50/80; H02J 50/40; H02J 7/00034; H02J 50/12; H04W 4/80; H04W 52/04; H04B 5/24; H04B 5/79
See application file for complete search history.

(56) References Cited

U.S. PATENT DOCUMENTS 11,081,911 B1 *   8/2021   Nalbant ................. H04B 5/266
12,255,469 B2 *   3/2025   Sato ......................... H04B 5/79
(Continued)

FOREIGN PATENT DOCUMENTS

WO        2021/045526 A1      3/2021

OTHER PUBLICATIONS

Extended European Search Report in European Appln. No. 22804966.
4, mailed on Jun. 4, 2025, 9 pages.
(Continued)

*Primary Examiner* — Andrew Wendell
(74) *Attorney, Agent, or Firm* — Fish & Richardson P.C.

(57)      ABSTRACT

A method, performed by a wireless power transmitter, for transmitting wireless power in a wireless power transmission system, comprises: receiving, from at least one wireless power transmitter, a configuration packet notifying the availability of out of band (OB) in a configuration phase; transmitting, to the at least one wireless power receiver, a capability packet notifying the availability of the OB in a negotiation phase; and establishing a Bluetooth low energy (BLE) connection with the at least one wireless power receiver on the basis of the configuration packet and the capability packet, wherein the BLE connection is a connection based on a BLE isochronous (ISO) channel, and through the BLE connection, the at least one wireless power transmitter exchanges at least one piece of power control data with the at least one wireless power receiver in at least one sub-event included in an interval of the BLE ISO channel.

15 Claims, 35 Drawing Sheets

(56)  References Cited

U.S. PATENT DOCUMENTS

| | | | | |
|---|---|---|---|---|
| 2015/0289297 A1* | 10/2015 | Xiang | ............... | H04W 72/04 |
| | | | | 370/329 |
| 2016/0261142 A1* | 9/2016 | Park | ................. | H02J 50/402 |
| 2018/0278099 A1* | 9/2018 | Hong | ................. | H02J 50/90 |
| 2021/0184512 A1* | 6/2021 | Hiramatsu | .......... | H02J 7/00045 |
| 2022/0006330 A1* | 1/2022 | AbuKhalaf | ............ | H02J 50/40 |
| 2022/0124553 A1* | 4/2022 | Chen | ................. | H04L 1/203 |
| 2022/0407932 A1 | 12/2022 | Lee | | |
| 2024/0396377 A1* | 11/2024 | Shichino | ................ | H04B 5/79 |

OTHER PUBLICATIONS

Woolley, "Bluetooth Core Specification Version 5.2 Feature Over-view," Bluetooth, Dec. 2020, 37 pages.

\* cited by examiner

Figure 4:
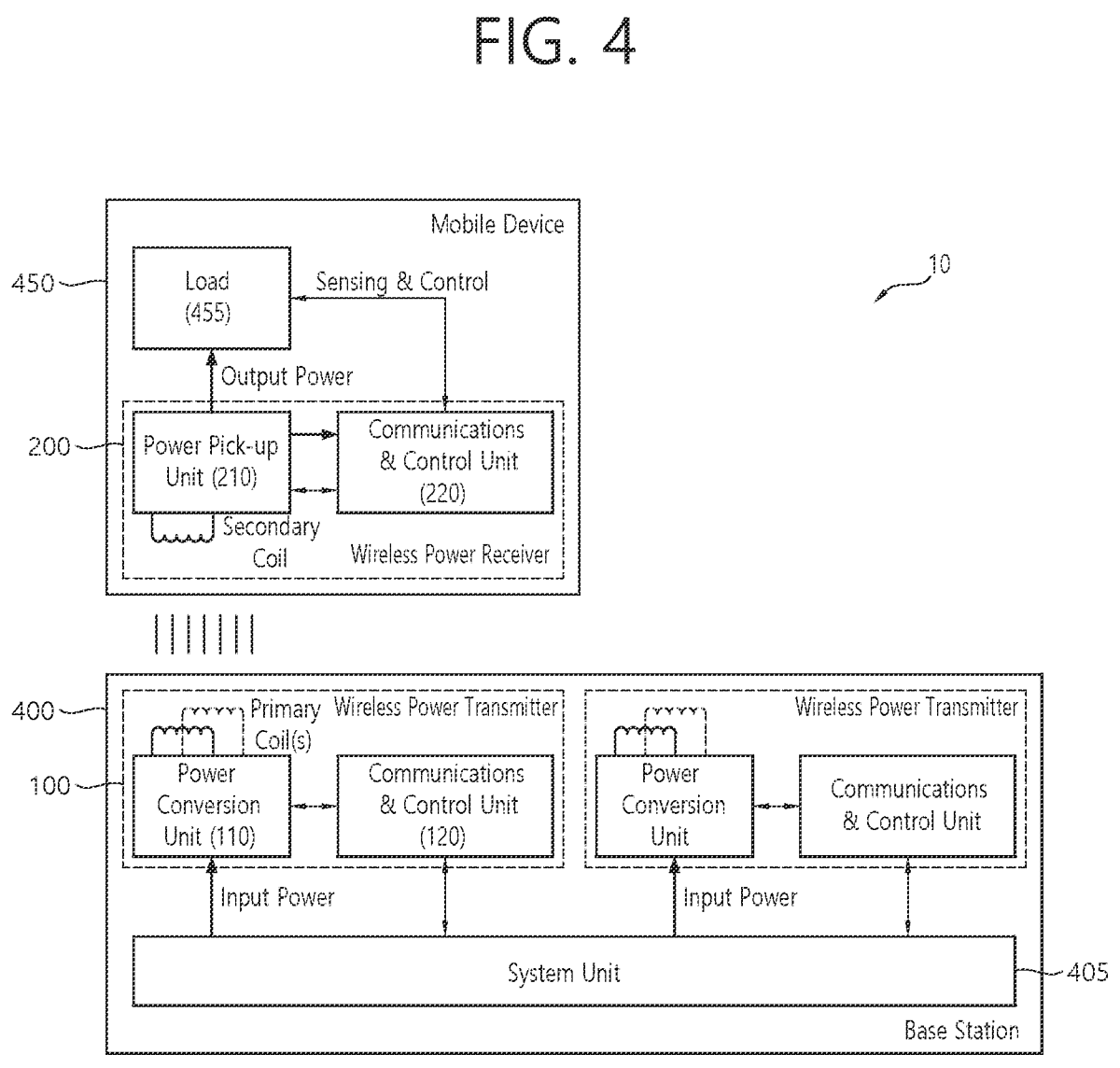

Mobile Device

Load
(455)

450

Sensing & Control

Output Power

Power Pick-up
Unit (210)

Secondary
Coil

Communications
& Control Unit
(220)

Wireless Power Receiver

200

Primary
Coil(s)

Wireless Power Transmitter

Power
Conversion
Unit (110)

Communications
& Control Unit
(120)

Input Power

400

100

System Unit

Wireless Power Transmitter

Power
Conversion
Unit

Communications
& Control Unit

Input Power

Base Station

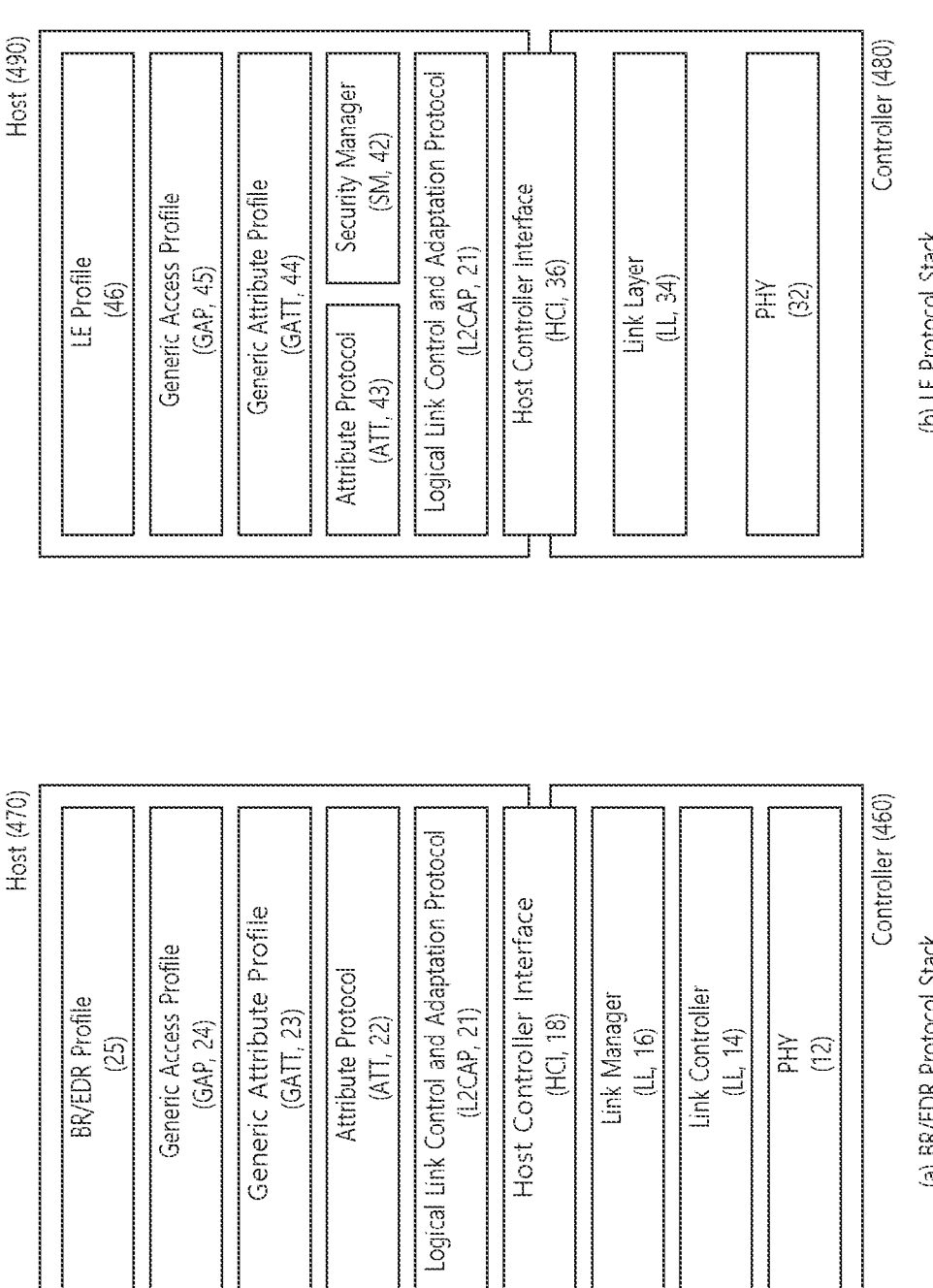

Host (470)

BR/EDR Profile (25)

Generic Access Profile (GAP, 24)

Generic Attribute Profile (GATT, 23)

Attribute Protocol (ATT, 22)

Logical Link Control and Adaptation Protocol (L2CAP, 21)

Host Controller Interface (HCI, 18)

Link Manager (LL, 16)

Link Controller (LL, 14)

PHY (12)

Controller (460)

(a) BR/EDR Protocol Stack

Host (490)

LE Profile (46)

Generic Access Profile (GAP, 45)

Generic Attribute Profile (GATT, 44)

Security Manager (SM, 42)

Attribute Protocol (ATT, 43)

Logical Link Control and Adaptation Protocol (L2CAP, 21)

Host Controller Interface (HCI, 36)

Link Layer (LL, 34)

PHY (32)

Controller (480)

(b) LE Protocol Stack

|       | b7   | b6  | b5       | b4  | b3   | b2   | b1   | b0  |
|-------|------|-----|----------|-----|------|------|------|-----|
| B0    | '00' |     | Reference Power |||||||
| B1    | Reserved |||||||||
| B2    | ZERO | AI  | Reserved | OB  | ZERO | Count |||
| B3    | Window Size ||||| Window Offset ||||
| B4    | Neg  | Pol | Depth ||| Buffer Size ||| Dup |

Extended Power Transfer Contract

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 22

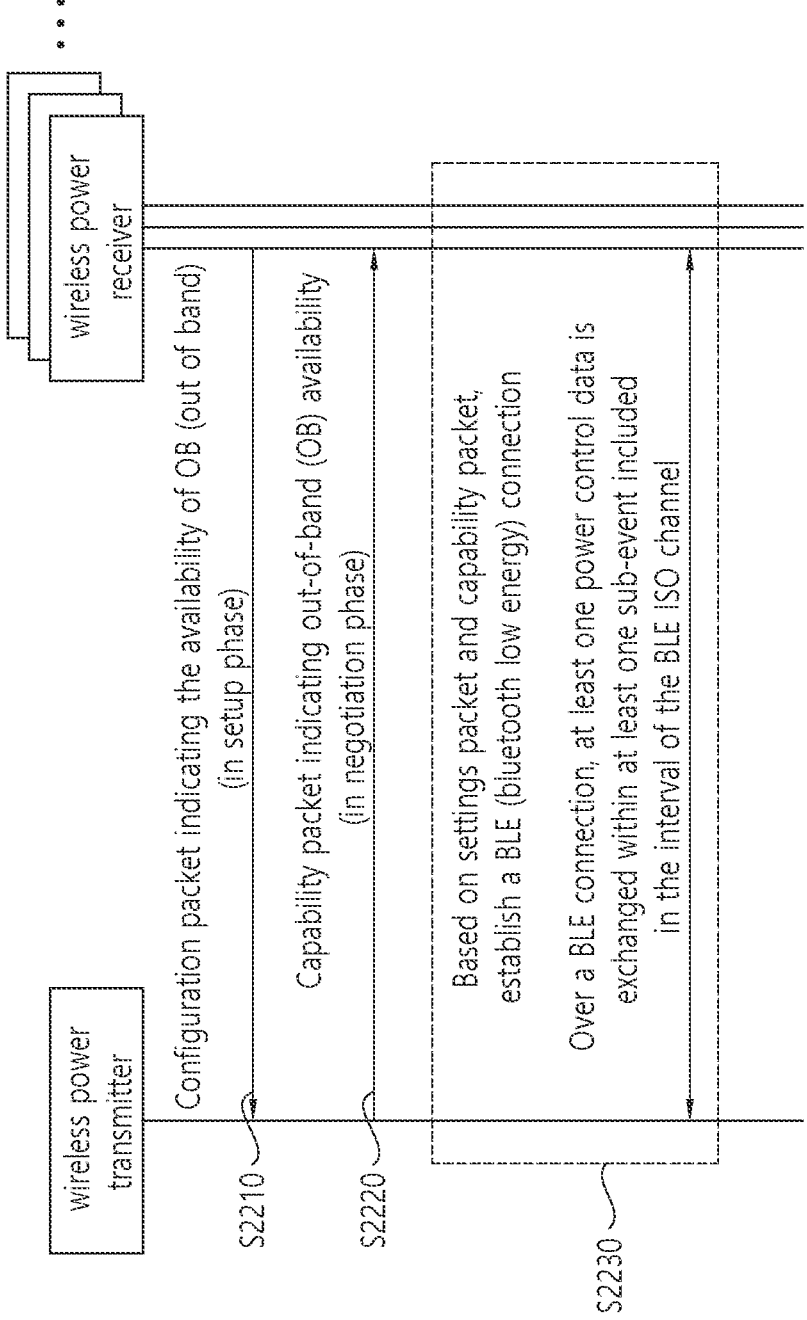

wireless power transmitter wireless power receiver

Configuration packet indicating the availability of OB (out of band)
(in setup phase)

S2210

Capability packet indicating out-of-band (OB) availability
(in negotiation phase)

S2220

Based on settings packet and capability packet,
establish a BLE (bluetooth low energy) connection Over a BLE connection, at least one power control data is
exchanged within at least one sub-event included
in the interval of the BLE ISO channel

S2230

FIG. 23
In-Band communication time ≈ 100ms
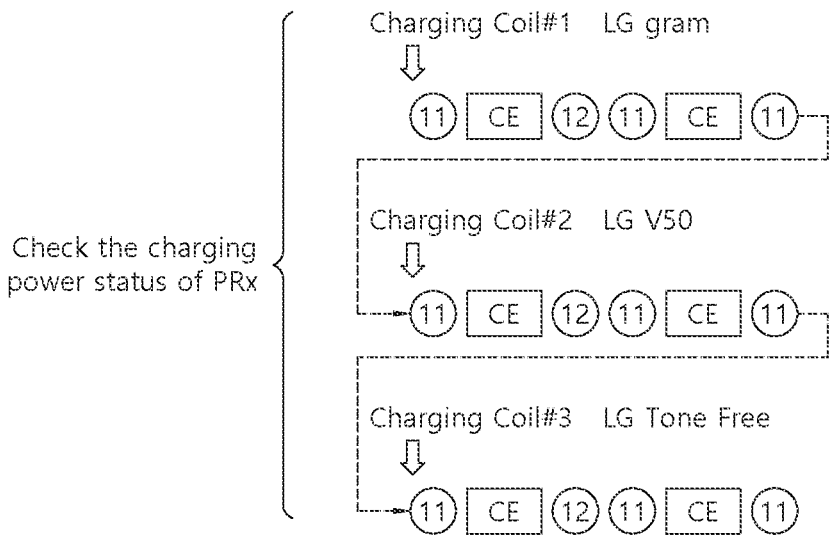
Check the charging power status of PRx
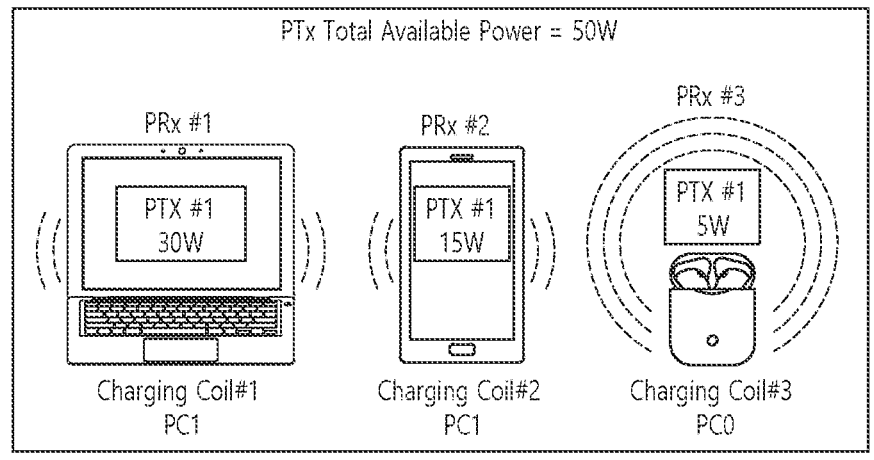

FIG. 24
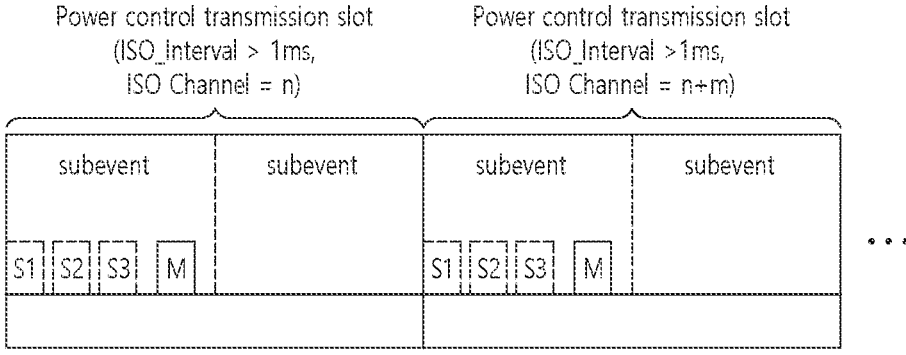
M : PTx data        - M: PTx (Master) Power Control Configuration or Aggregated ACK/NAK
S# : PRx #No data   - S#1: Power Control Status of PRx #1
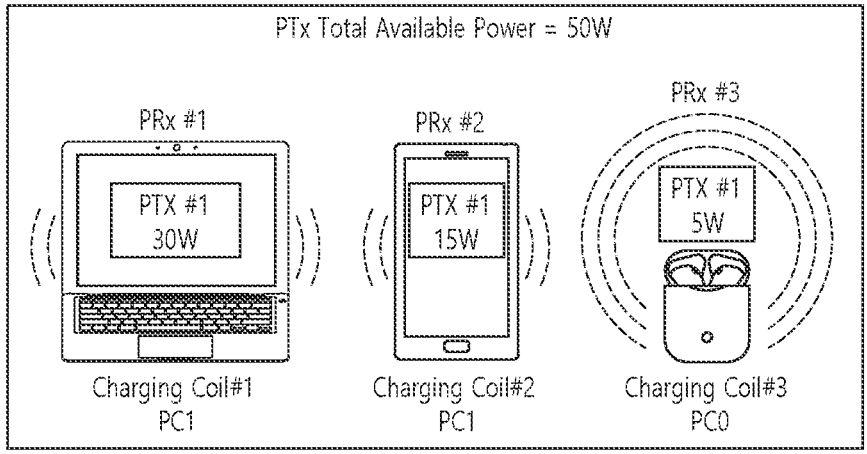

FIG. 25
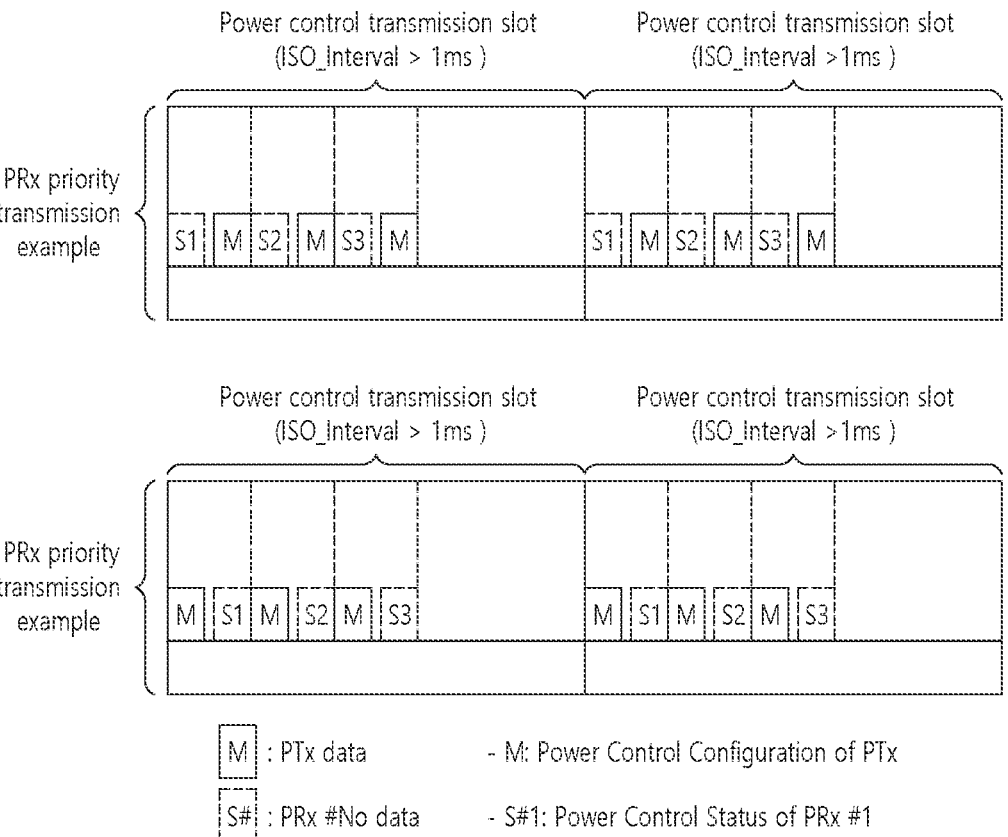
M : PTx data          - M: Power Control Configuration of PTx
S# : PRx #No data     - S#1: Power Control Status of PRx #1
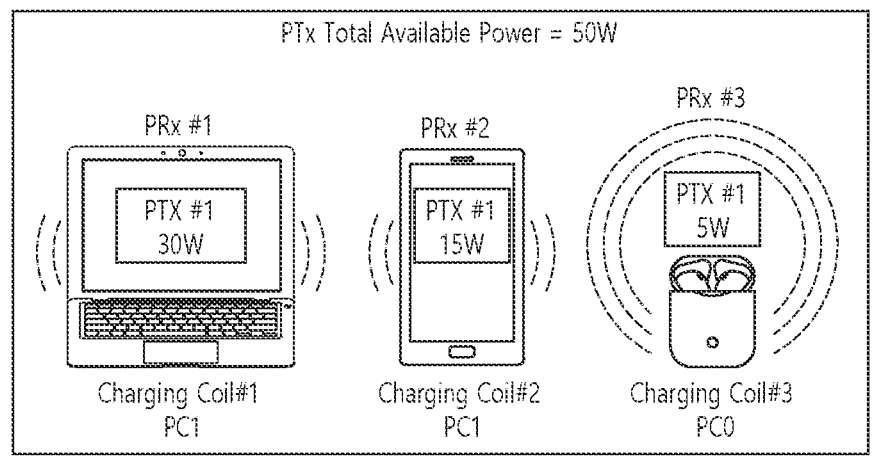

FIG. 29
Example # 1) Transmitting PTx data
and multiple PRx (sequential) data within one subevent
PTx does not transmit ACK/NAK
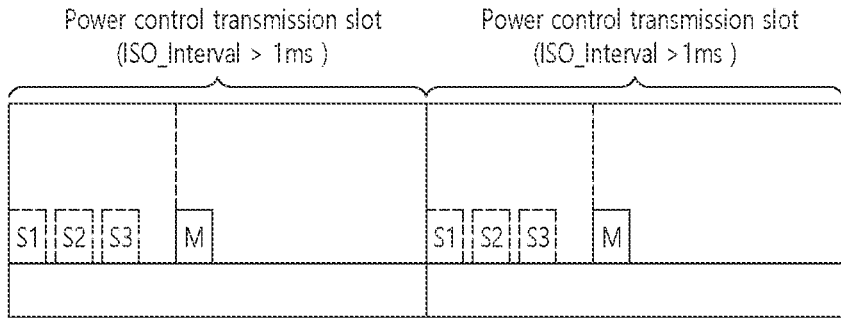
PTx transmits ACK or NAK
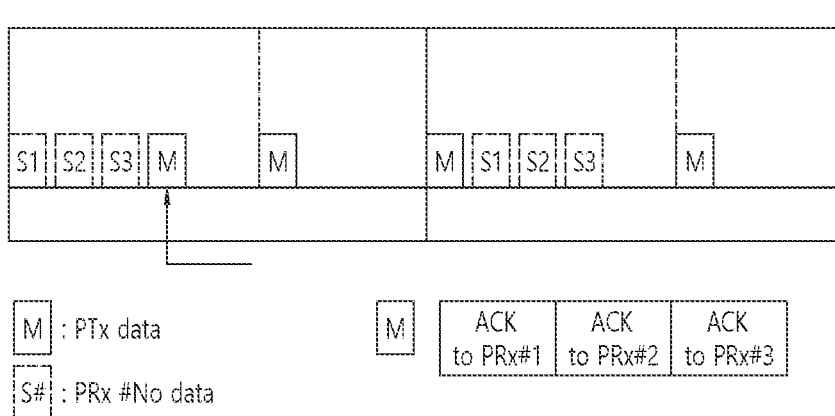

FIG. 30
Example # 2) Subevent section allocation for each PRx:
Transmitted in Request-Response format between PTx and multiple PRx
PTx does not transmit ACK/NAK
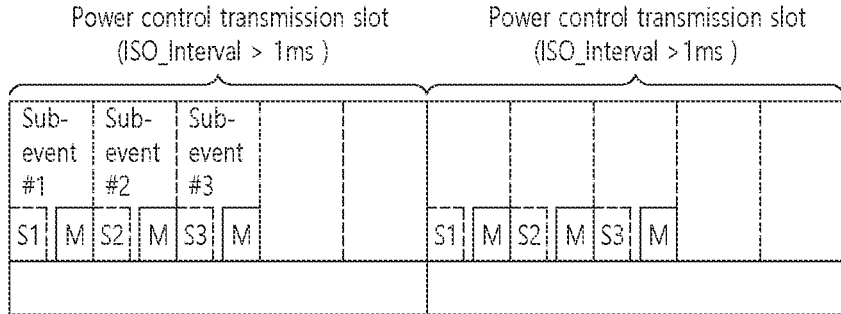
PTx transmits ACK or NAK
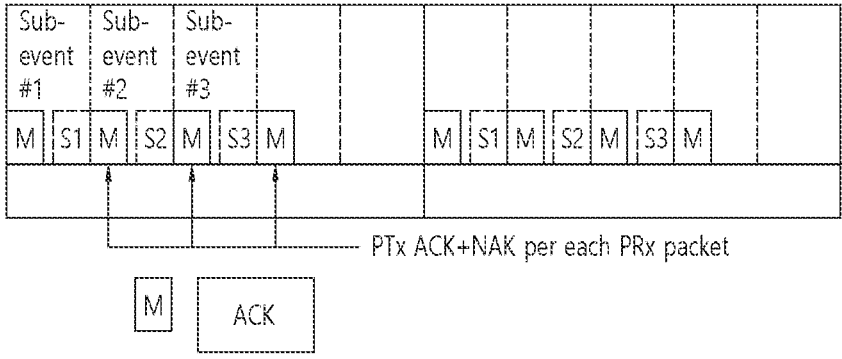

FIG. 31
Example # 3) Subevent section allocation for each PRx:
PTx transmits data only to the last subevent Data transmission per PRx per subevent
PTx does not transmit ACK/NAK
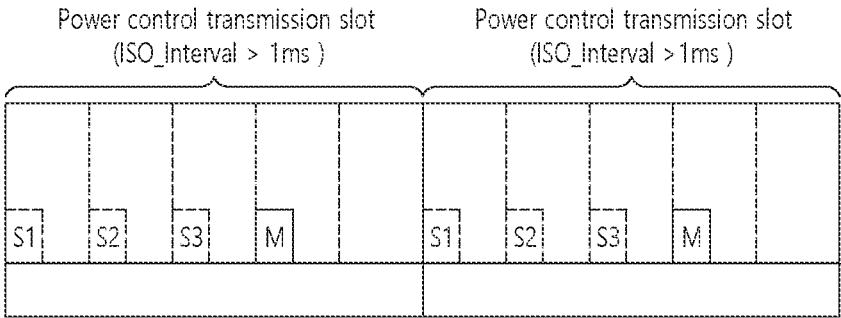
PTx transmits ACK or NAK
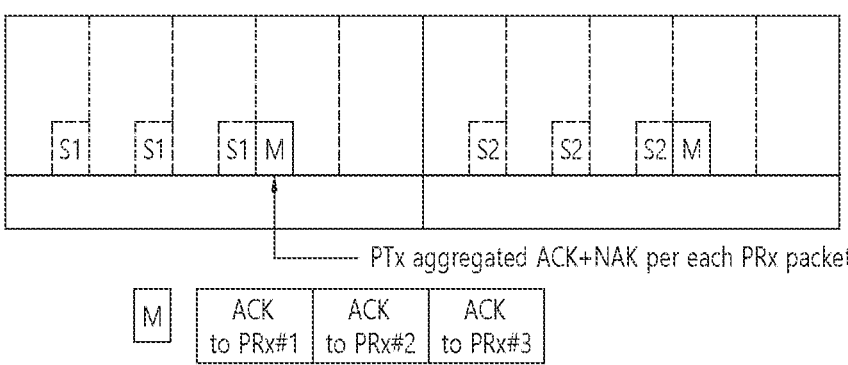

FIG. 32
Example # 1) Transmitting PTx data
and multiple PRx (sequential) data within one subevent
PTx does not transmit ACK/NAK
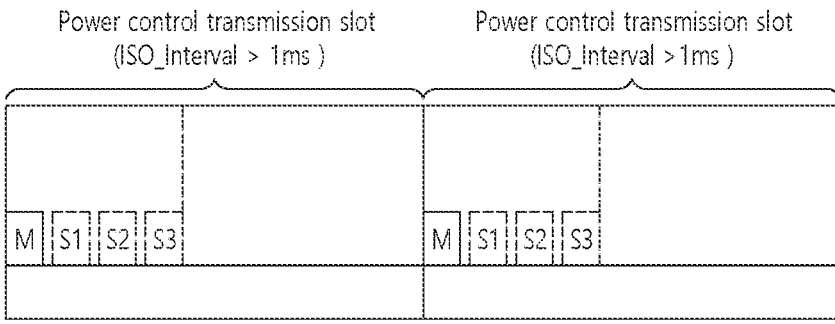
PTx transmits ACK or NAK
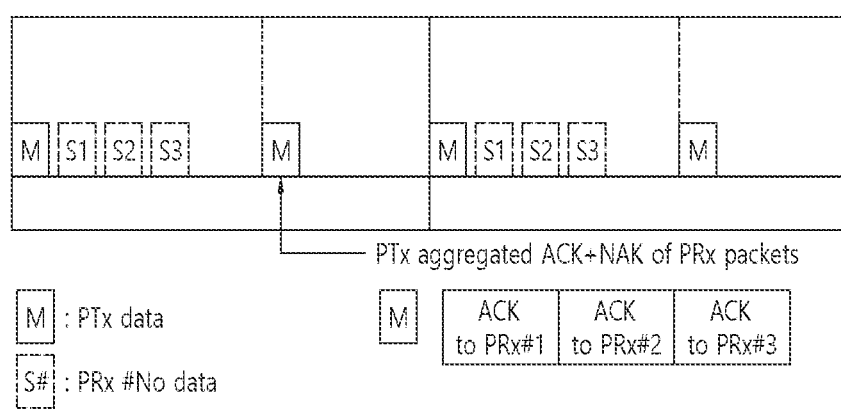

FIG. 33
Example # 2) Subevent section allocation for each PRx:
Transmitted in Request-Response format between PTx and multiple PRx
PTx does not transmit ACK/NAK
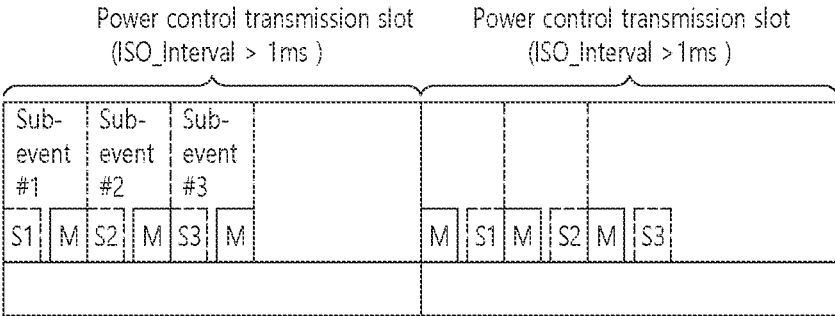
PTx transmits ACK or NAK
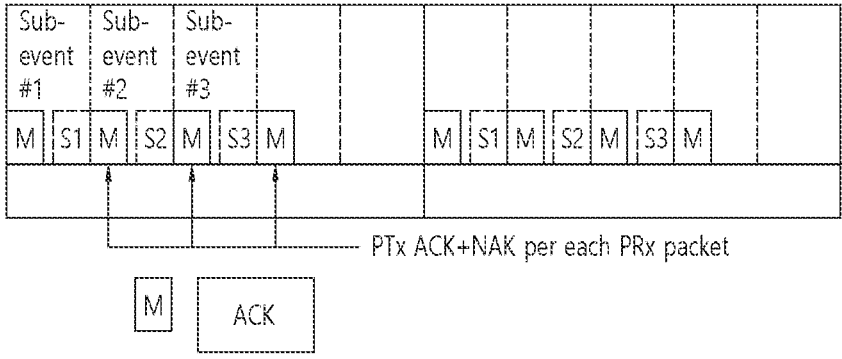

FIG. 34
Example # 3) Subevent section allocation for each PRx:
PTx transmits data only for the first subevent Data transmission per PRx per subevent
PTx does not transmit ACK/NAK
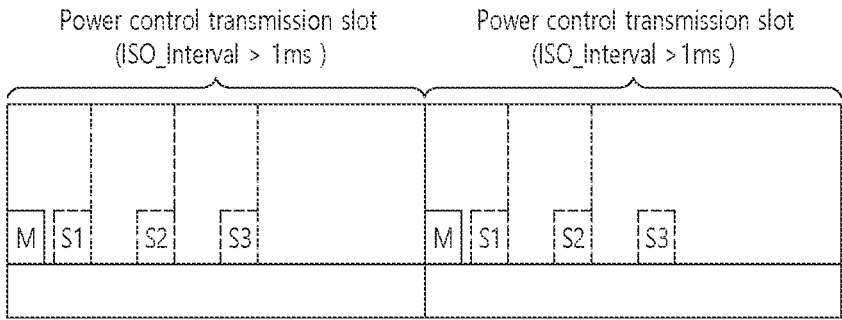
PTx transmits ACK or NAK
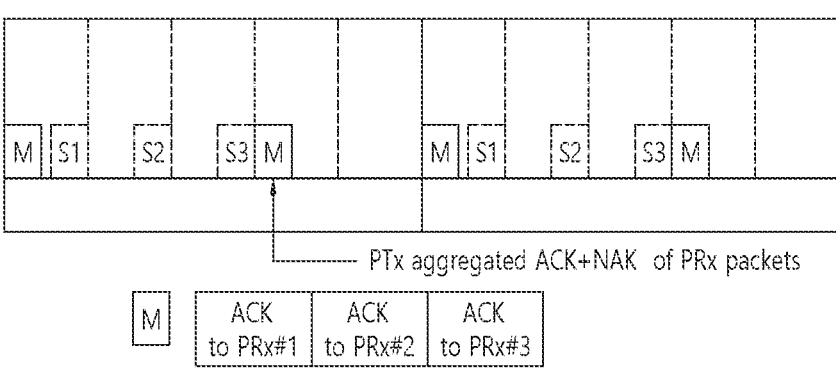

FIG. 39

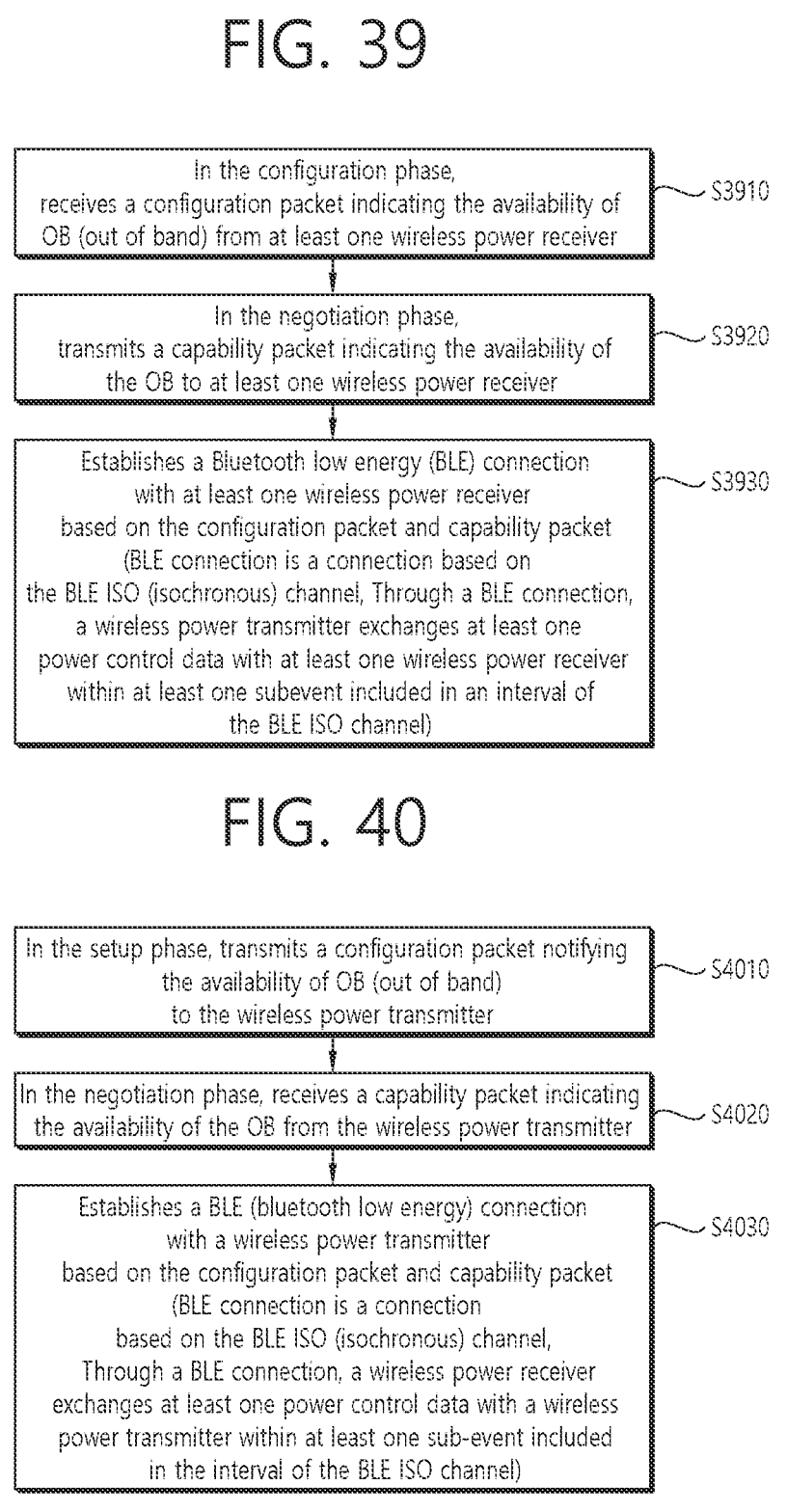

In the configuration phase,
receives a configuration packet indicating the availability of
OB (out of band) from at least one wireless power receiver — S3910

In the negotiation phase,
transmits a capability packet indicating the availability of
the OB to at least one wireless power receiver — S3920

Establishes a Bluetooth low energy (BLE) connection
with at least one wireless power receiver
based on the configuration packet and capability packet
(BLE connection is a connection based on
the BLE ISO (isochronous) channel, Through a BLE connection,
a wireless power transmitter exchanges at least one
power control data with at least one wireless power receiver
within at least one subevent included in an interval of
the BLE ISO channel) — S3930

FIG. 40

In the setup phase, transmits a configuration packet notifying
the availability of OB (out of band)
to the wireless power transmitter — S4010

In the negotiation phase, receives a capability packet indicating
the availability of the OB from the wireless power transmitter — S4020

Establishes a BLE (bluetooth low energy) connection
with a wireless power transmitter
based on the configuration packet and capability packet
(BLE connection is a connection
based on the BLE ISO (isochronous) channel,
Through a BLE connection, a wireless power receiver
exchanges at least one power control data with a wireless
power transmitter within at least one sub-event included
in the interval of the BLE ISO channel) — S4030

METHOD AND APPARATUS FOR CONTROLLING POWER BETWEEN PLURALITY OF DEVICES THROUGH OUT-OF-BAND COMMUNICATION IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/007068, filed on May 17, 2022, which claims the benefit of Korean Patent Application No. 10-2021-0063589, filed on May 17, 2021. The disclosures of the prior applications are incorporated by reference in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles. Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, it is intended to provide a method of controlling power between multiple devices through out-of-band communication and a device using the same.

SUMMARY

According to an embodiment of the present specification, a method and apparatus may be provided in which a wireless power transmitter exchanges at least one power control data with at least one wireless power receiver within at least one sub-event included in an interval of a BLE ISO channel through BLE connection.

According to the present specification, the effect of dynamically managing charging power can occur through rapid and safe message exchange with multiple devices within an effective charging range between wireless charging devices. Additionally, it can have the effect of safely and quickly identifying and managing one or multiple devices and their wireless charging status.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 4 is a block diagram of a wireless power transmission system according to one embodiment.

FIG. 5 is a diagram illustrating an example of a Bluetooth communication architecture to which an embodiment according to the present disclosure may be applied.

FIG. 22 is a flowchart of a method for transmitting wireless power, according to an embodiment of the present specification.

FIG. 23 shows an example of transmitting and receiving a dynamic packet through in-band.

FIGS. 24 and 25 show examples of transmitting and receiving dynamic packets through BLE.

FIG. 29 schematically shows an example in which data of the wireless power receiver is transmitted and received first according to option 1.

FIG. 30 schematically shows an example in which data of the wireless power receiver is transmitted and received first according to option 2.

FIG. 31 schematically shows an example in which data of the wireless power receiver is transmitted and received first according to option 3.

FIG. 32 schematically shows an example in which data of the wireless power transmitter is transmitted and received first according to option 1.

FIG. 33 schematically shows an example in which data of the wireless power transmitter is transmitted and received first according to option 2.

FIG. 34 schematically shows an example in which data of the wireless power transmitter is transmitted and received first according to option 3.

FIG. 39 is a flowchart of a method for transmitting wireless power performed by a wireless power transmitter according to an embodiment of the present specification.

FIG. 40 is a flowchart of a method of receiving wireless power performed by a wireless power receiver, according to an embodiment of the present specification.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A. B or C" or "at least one of A. B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
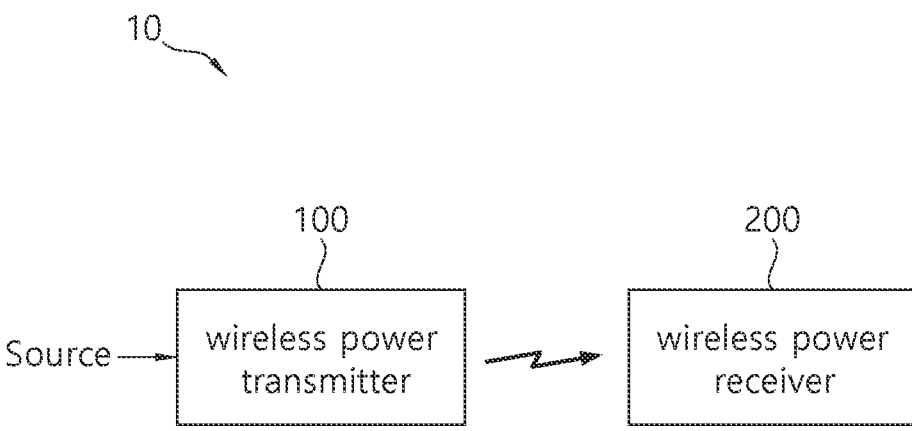
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
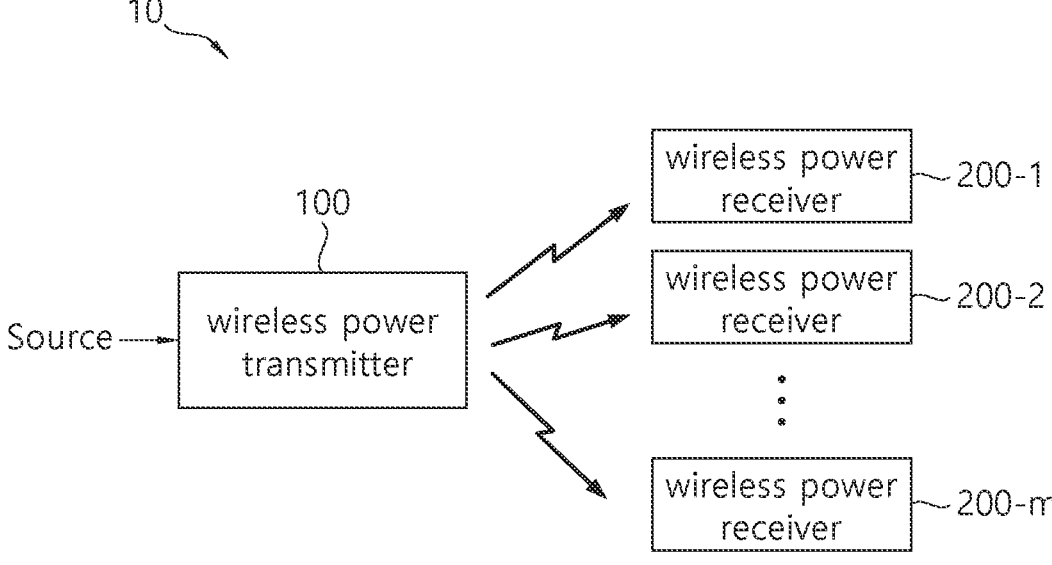
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
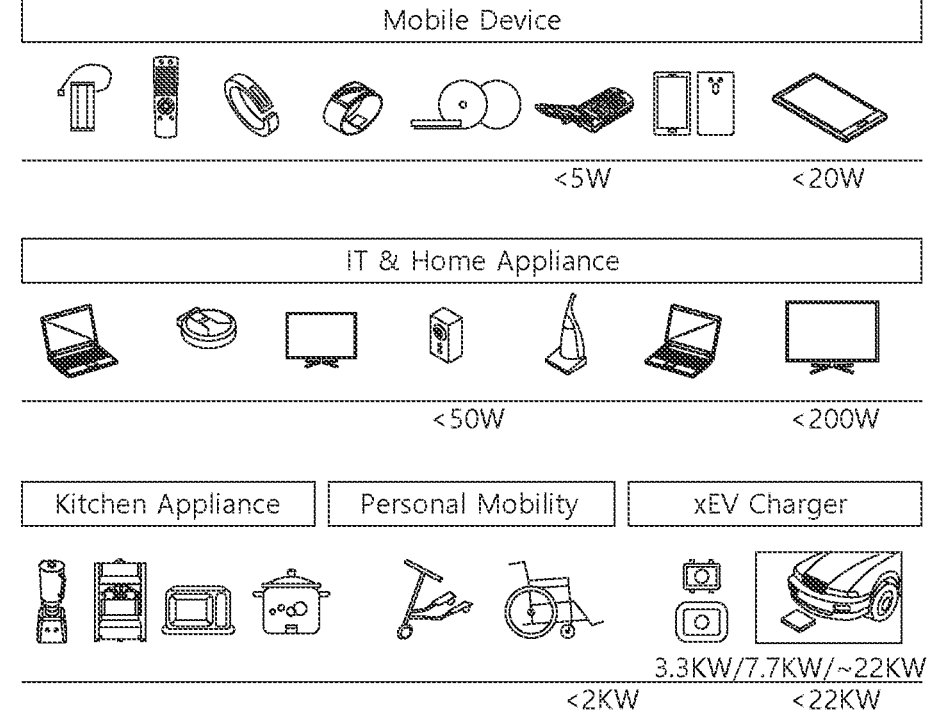
FIG. 3 shows an exemplary embodiment of diverse electronic devices adopting a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 KW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user can experience a smart wireless charging service in a hotel. When a user enters a hotel room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Welcome to ###hotel. Select "Yes" to activate smart charging functions: Yes|No Thanks." The smartphone receives the user's input of selecting Yes or No Thanks and performs the next procedure selected by the user. If Yes is selected, the smartphone transmits the information to the wireless charger. And the smartphone and wireless charger perform the smart charging function together.

Smart wireless charging service may also include receiving auto-filled WiFi credentials. For example, a wireless charger transmits WiFi credentials to a smartphone, and the smartphone runs the appropriate app and automatically enters the WiFi credentials received from the wireless charger.

Smart wireless charging service may also include running a hotel application that provides hotel promotions, remote check-in/check-out, and obtaining contact information.

As another example, users can experience smart wireless charging services within a vehicle. When the user gets into the vehicle and places the smartphone on the wireless charger, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user to confirm his or her identity.

In this state, the smartphone automatically connects to the car via WiFi and/or Bluetooth. The smartphone can display the message on the screen with or without an alarm sound. An example of a message may include phrases such as "Welcome to your car. Select "Yes" to synch device with in-car controls: Yes|No Thanks." The smartphone receives the user's input of selecting Yes or No Thanks and performs the next procedure selected by the user. If Yes is selected, the smartphone transmits the information to the wireless charger. And by running the in-vehicle application/display software, the smartphone and wireless charger can perform in-vehicle smart control functions together. Users can enjoy the music they want and check regular map locations. In-vehicle application/display software may include the capability to provide synchronized access for pedestrians.

As another example, users can experience smart wireless charging at home. When a user enters a room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Hi xxx, Would you like to activate night mode and secure the building ?: Yes|No Thanks." The smartphone receives the user's input of selecting Yes or No Thanks and performs the next procedure selected by the user. If Yes is selected, the smartphone transmits the information to the wireless charger. Smartphones and wireless chargers can at least recognize user patterns and encourage users to lock doors and windows, turn off lights, or set alarms.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 KHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 is a block diagram of a wireless power transmission system according to one embodiment.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE. ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

Meanwhile, in the WPC system, the wireless power transmitter 100 may be classified, for example, in terms of power transmission amount. At this time, the wireless power transmitter 100 supporting a wireless power transmission amount of up to 5 W (i.e., the wireless power transmitter 100 supporting the BPP protocol) can be classified into, for example, type A wireless power transmitter 100 and type B wireless power transmitter 100, the wireless power transmitter 100 supporting a wireless power transmission amount of up to 15 W (i.e., the wireless power transmitter 100 supporting the EPP protocol) can be classified into, for example, type MP-A (MP-A) wireless power transmitter 100 and type MP-B (type MP-B) wireless power transmitter 100.

Type A and Type MP A wireless power transmitters (100)

Type A and Type MP A wireless power transmitters 100 may have one or more primary coils. Type A and Type MP A wireless power transmitters 100 activate a single primary coil at a time, so a single primary cell matching the activated primary coil can be used.

Type B and Type MP B wireless power transmitter (100)

Type B and Type MP B power transmitters may have a primary coil array And Type B and Type MP B power transmitters can enable free positioning. To this end, Type B and Type MP B power transmitters can activate one or more primary coils in the array to realize primary cells at different locations on the interface surface.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Meanwhile, although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 5.

FIG. 5 is a diagram illustrating an example of a Bluetooth communication architecture to which an embodiment according to the present disclosure may be applied.

Referring to FIG. 5, (a) of FIG. 5 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 5, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 5, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

①Request and Response message: A request message is a message for requesting specific information from the client device to the server device, and the response message is a response message to the request message, which is a message transmitted from the server device to the client device.

②Command message: It is a message transmitted from the client device to the server device in order to indicate a command of a specific operation. The server device does not transmit a response with respect to the command message to the client device.

③Notification message: It is a message transmitted from the server device to the client device in order to notify an event, or the like. The client device does not transmit a confirmation message with respect to the notification message to the server device.

④Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

①Service: It defines a basic operation of a device by a combination of behaviors related to data ②Include: It defines a relationship between services ③Characteristics: It is a data value used in a server ④Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time. Object Delivery Service, and the like, and details of the GATT-based profiles are as follows.

①Battery: Battery information exchanging method

②Time: Time information exchanging method

③FindMe: Provision of alarm service according to distance

④Proximity: Battery information exchanging method

⑤Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value. When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 6:
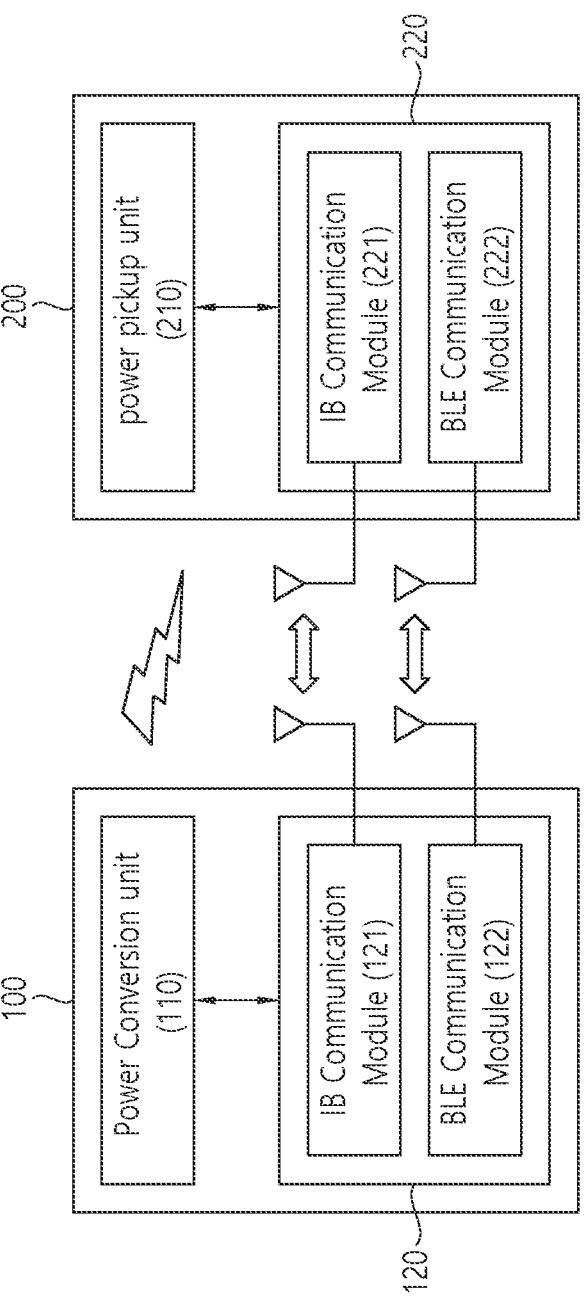
FIG. 6 is a block diagram illustrating a wireless power transfer system using BLE communication according to an example.

When the communication/control circuit 120 and the communication/control circuit 220 include Bluetooth or Bluetooth LE as an OB communication module in addition to the IB communication module, the wireless power transmitter 100 including the communication/control circuit 120 and the wireless power receiver 200 including the communication/control circuit 220 may be represented by a simplified block diagram as shown in FIG. 6.

FIG. 6 is a block diagram illustrating a wireless power transfer system using BLE communication according to an example.

Referring to FIG. 6, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 5. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 7:
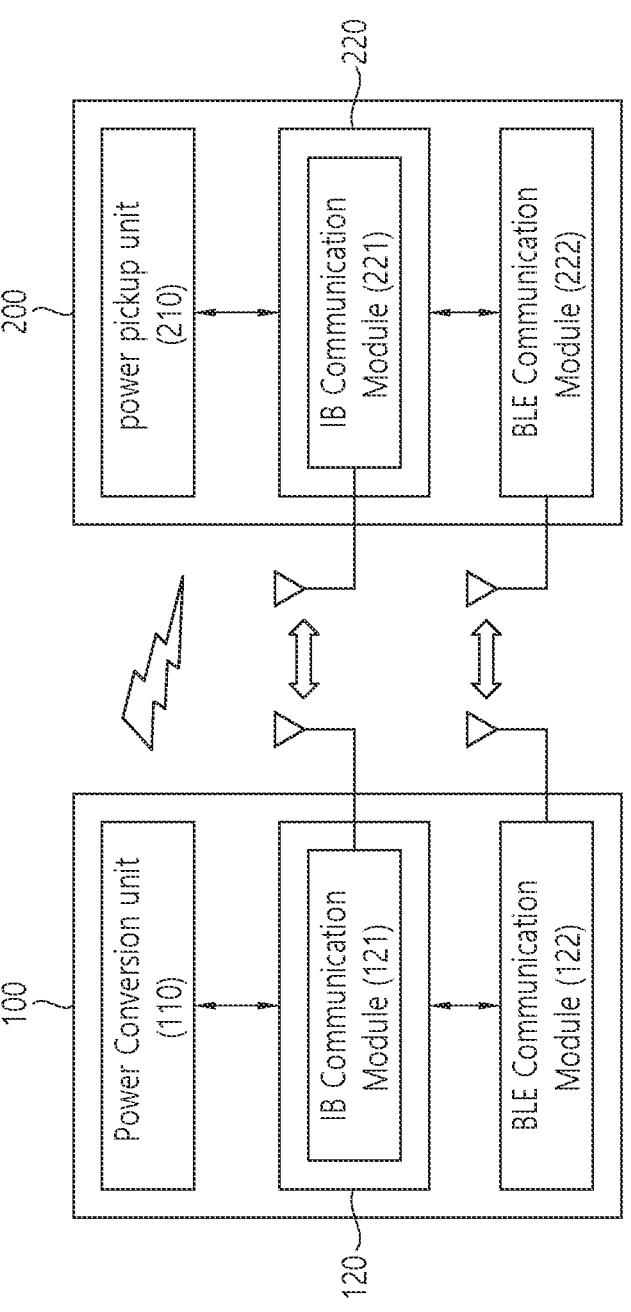
FIG. 7 is a block diagram illustrating a wireless power transfer system using BLE communication according to another example.

FIG. 7 is a block diagram illustrating a wireless power transfer system using BLE communication according to another example.

Referring to FIG. 7, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Meanwhile, when the user places the wireless power receiver 200 within the operating volume of the wireless power transmitter 100, the wireless power transmitter 100 and the wireless power receiver 200 begin communication for the purpose of configuring and controlling power transmission. At this time, the power signal can provide a carrier for all communications, and the protocol for communication can be composed of several steps. Hereinafter, the communication protocol will be described.

Figure 8:
FIG. 8 is a state transition diagram for explaining the wireless power transfer procedure.

FIG. 8 is a state transition diagram for explaining the wireless power transfer procedure.

WPC can define two communication protocols.

Baseline Protocol (or BPP): May refer to an original protocol that supports only one-way communication from the wireless power receiver 200 to the wireless power transmitter 100.

Extended Protocol (or EPP): Supports two-way communication and improved foreign object detection (FOD) functions, and can also support data transport stream functions and authentication options.

Referring to FIG. 8, the power transfer operation between the wireless power transmitter 100 and the wireless power receiver 200 according to an embodiment of the present specification can be largely divided into a ping phase (810), a configuration phase (820), a negotiation phase (830), and a power transfer phase.

Ping Phase (810)

In the ping phase 810, the wireless power transmitter 100 may attempt to establish communication with the wireless power receiver 200. Before attempting to establish communication, measurements may be performed to determine whether there are objects such as bank cards, coins or other metals that may be damaged or heated during power transfer. Here, these measurements can be performed without waking up the wireless power receiver 200.

Here, after obtaining design information from the wireless power receiver 200, the wireless power transmitter 100 may postpone a conclusion about whether the detected metal is a foreign object or a friendly metal to the negotiation phase 830.

Configuration Phase (820)

In the configuration phase 820, the wireless power receiver 200 may send basic identification and configuration data to the wireless power receiver 200. And, both the wireless power transmitter 100 and the wireless power receiver 200 can use this information to create a baseline power transfer contract.

Additionally, the wireless power transmitter 100 and the wireless power receiver 200 may determine whether to continue the baseline protocol or the extended protocol in the configuration phase 820.

Here, the wireless power receiver 200 can use functions such as enhanced FOD, data transport stream, and authentication only when implementing the extended protocol.

Negotiation Phase (830)

In the negotiation phase 830, the wireless power transmitter 100 and the wireless power receiver 200 may establish an extended power transfer contract that includes additional settings and restrictions. Additionally, the wireless power receiver 200 may provide design information to the wireless power transmitter 100. Later, the design information can be used to complete the FOD before transitioning to the power transfer phase 840.

Here, the negotiation phase 830 may correspond to a step that does not exist in the baseline protocol.

Power Transfer Phase (840)

The power transfer phase 840 may be a step in which power is transferred to the load of the wireless power receiver 200.

In the extended protocol, the wireless power transmitter 100 and the wireless power receiver 200 may perform system calibration when this step begins. This stage may occasionally be interrupted to renegotiate elements of the power transfer contract. However, power transfer may continue even during this renegotiation.

Below, as previously explained, each protocol for Ping Phase 810. Configuration Phase 820, Negotiation Phase 830, and Power Transfer Phase 840 will be explained in more detail.

1. Ping Phase (810)

When the ping phase 810 begins, the wireless power transmitter 100 does not yet know whether the wireless power receiver 200 is within the operating volume. In addition, the wireless power receiver 200 cannot recognize the wireless power receiver 200. For that reason, this system is usually disabled due to lack of power signal.

In this situation, before the wireless power transmitter 100 starts a digital ping to request a response from the wireless power receiver 200, the wireless power transmitter 100 may go through the following steps.

Figure 9:
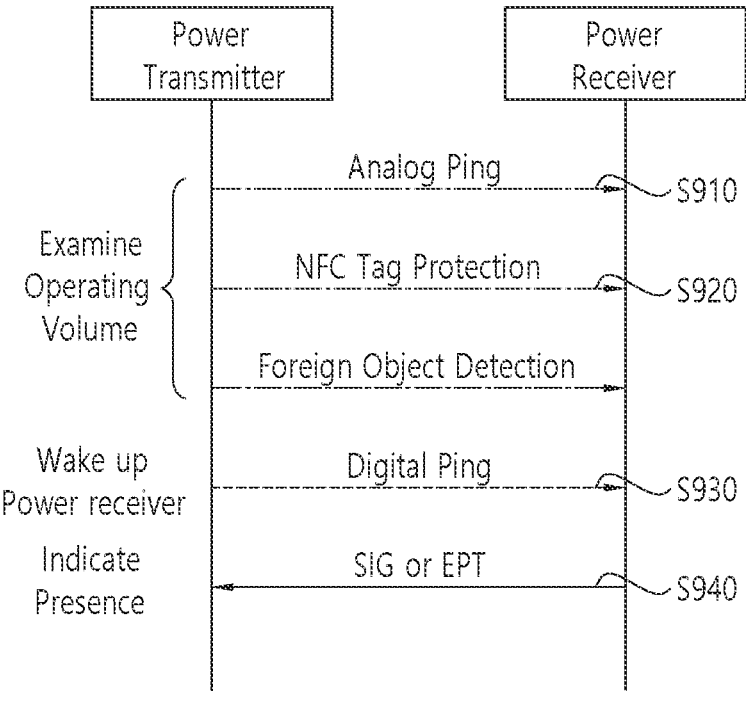
FIG. 9 schematically shows an example of the protocol of the ping phase 810.

FIG. 9 schematically shows an example of the protocol of the ping phase 810.

According to FIG. 9, the wireless power transmitter 100 can perform analog ping (S910). That is, the wireless power transmitter 100 can confirm whether an object exists in the operating volume by transmitting an analog ping. For example, a wireless power transmitter can detect whether an object exists in the operating space based on a change in current in the transmission coil or primary coil.

The wireless power transmitter 100 may apply NFC tag protection (S920). Here, NFC tag protection can be performed through the following procedures.

a) First, it can be confirmed whether one or more of the detected objects include an NFC tag.

b) Afterwards, it can be checked whether the object containing the NFC tag can withstand the power signal without damage.

c) If the wireless power transmitter 100 determines that the NFC tag cannot withstand the power signal, it does not start digital ping and maintains the ping phase, the wireless power transmitter 100 can inform the user of the reason why it cannot proceed.

The wireless power transmitter 100 may perform foreign object detection (S930). That is, the wireless power transmitter 100 can collect information helpful in determining whether there is a foreign object other than the wireless power receiver 200. For this purpose, the wireless power transmitter 100 can use various methods such as a pre-power FOD method.

Meanwhile, in the three steps (S910, S920, and S930) described above, the radio power receiver may not operate.

If the wireless power transmitter 100 performs the above steps and determines that the wireless power receiver 200 is potentially present in the operating volume, the wireless power transmitter 100 may start a digital ping (S940). Here, the digital ping may request a response such as a signal strength (SIG) data packet or an end power transfer (EPT) data packet from the wireless power receiver 200.

Thereafter, the wireless power transmitter 100 may receive the SIG or EPT from the wireless power receiver 200 (S950). Here, the SIG data packet may provide a measure of coupling, and the SIG data packet may include information about signal strength values. Additionally, the EPT data packet may provide a request to stop power transmission and a reason for the request.

If the wireless power transmitter 100 does not receive the above response from the wireless power receiver 200, the wireless power transmitter 100 may repeat the above steps while remaining in the ping phase 810.

2. Configuration phase (820)

The configuration phase 820 is part of the following protocol.

The wireless power receiver 200 can identify itself to the wireless power transmitter 100.

The wireless power receiver 200 and the wireless power transmitter 100 can establish a baseline power transfer contract.

The wireless power receiver 200 and the wireless power transmitter 100 can determine the protocol variant to be used for power transmission.

In the configuration phase 820, the wireless power transmitter 100 and the wireless power receiver 200 may continue to operate using the digital ping parameter. This may mean that the power and current levels of both the wireless power transmitter 100 and the wireless power receiver 200 change only when the user moves the wireless power receiver 200 from position within the operating volume.

Figures 10, 11:
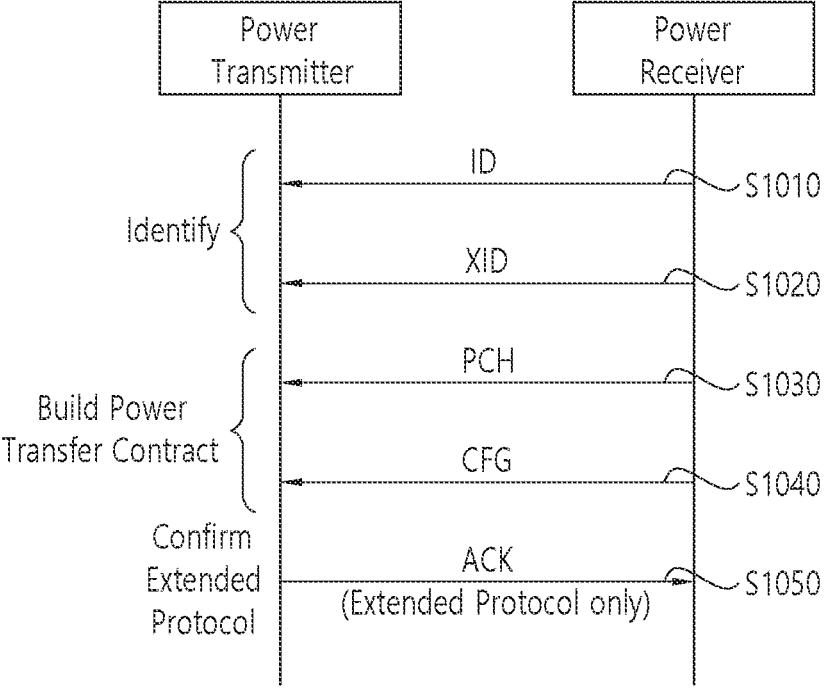
FIG. 10 schematically shows an example of the protocol of the configuration phase 820.
FIG. 11 is a diagram illustrating a message field of a configuration packet (CFG) of a wireless power reception device according to an embodiment.

Hereinafter, the protocol in the configuration phase 820 will be described in more detail. FIG. 10 schematically shows an example of the protocol of the configuration phase 820.

According to FIG. 10, the wireless power transmitter 100 may receive an identification (ID) from the wireless power receiver 200 (S1010). Alternatively, the wireless power transmitter 100 may also receive an extended identification (XID) from the wireless power receiver 200 (S1020). That is, the wireless power receiver 200 may identify itself using an ID data packet and, optionally, an XID data packet.

The wireless power transmitter 100 may selectively receive a power control hold-off (PCH) data packet from the wireless power receiver 200 (S1030), the wireless power transmitter 100 may receive a CFG data packet from the wireless power receiver 200 (S1040). That is, the wireless power receiver 200 can provide data for use in a power transfer contract using PCH and/or CFG data packets.

Finally, the wireless power transmitter 100 can check the extended protocol if possible (S1050).

Each data packet described above can be summarized as follows.

ID: The ID data packet may be information that identifies the wireless power receiver 200. Here, the ID may include a manufacturer code, basic device identifier, etc. In addition, the ID may also include information that identifies the presence or absence of an XID data packet in the setup phase.

XID: XID data packets may contain additional identification data.

PCH: The PCH data packet may configure the delay between the reception of the CE data packet and the wireless power transmitter 100 starting coil current adjustment.

CFG: CFG data packets can provide basic configuration data.

For example, a CFG data packet can provide all parameters governing power transfer in the baseline protocol. In addition, CFG data packets can provide all FSK communication parameters used in the extended protocol. Additionally, CFG data packets may provide additional functions of the wireless power receiver 200.

FIG. 11 is a diagram illustrating a message field of a configuration packet (CFG) of a wireless power reception device according to an embodiment.

According to FIG. 11, the configuration packet (CFG) according to one embodiment may have a header value of 0x51, and the message field of the configuration packet (CFG) may include a 1-bit authentication (AI) flag and a 1-bit outband (OB) flag.

The authentication flag (AI) indicates whether the wireless power receiving device supports the authentication function. For example, if the value of the authentication flag (AI) is '1', it indicates that the wireless power receiving device supports the authentication function or can operate as an authentication initiator, if the value of the authentication flag (AI) is '0', it may indicate that the wireless power receiving device does not support the authentication function or cannot operate as an authentication initiator.

The out-of-band (OB) flag indicates whether the wireless power receiving device supports out-of-band communication. For example, if the value of the out-of-band (OB) flag is '1', the wireless power receiver indicates out-of-band communication, if the value of the outband (OB) flag is '0', it may indicate that the wireless power receiving device does not support outband communication.

Provision of the ID and/or XID described above is for identification purposes. Additionally, the provision of PCH and/or CFG is for the construction of a power transfer contract.

3. Negotiation Phase (830)

The negotiation phase 830 is part of an extended protocol that allows the wireless power transmitter 100 and the wireless power receiver 200 to change the power transfer contract. There are two types of this stage.

Negotiation phase (830): The negotiation phase (830) directly follows the configuration phase (820) and serves to create an initial extended power transfer contract. In addition, the negotiation phase 830 also serves to complete the pre-power FOD function. Here, the length of the negotiation phase is not limited.

Renegotiation phase: The renegotiation phase can interrupt the power transfer phase (840) multiple times and generally serves to adjust a single element of the power transfer contract. In addition, FOD/qf, FOD/rf, and SRQ/rpr data packets may not be used in the renegotiation phase. Constraints on CE data packets in the power transfer phase 840 limit the length of the renegotiation phase.

In the negotiation or renegotiation phase, the power transfer contract related to the reception/transmission of wireless power between a wireless power receiving device and a wireless power transmitting device is expanded or changed, or a renewal of the power transfer contract is made that adjusts at least some of the elements of the power transfer contract, or information may be exchanged to establish out-of-band communication.

Figure 12:
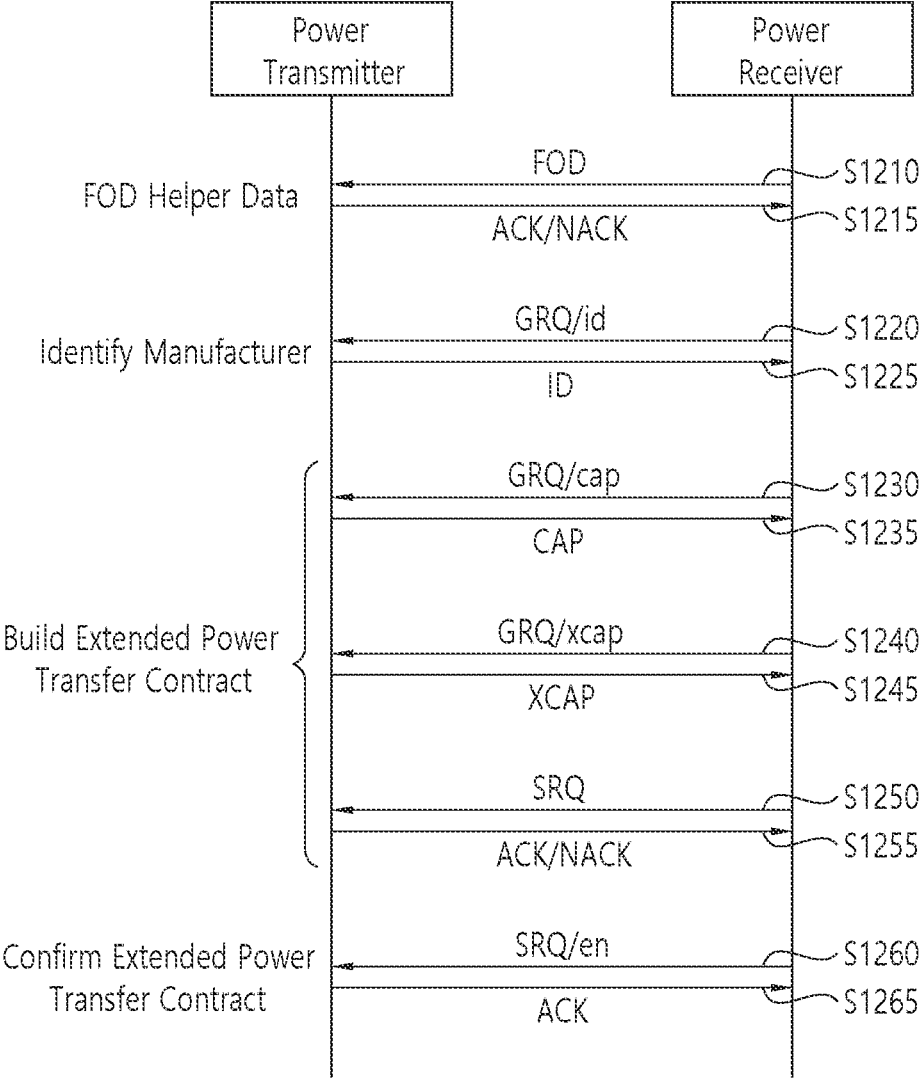
FIG. 12 is a flowchart schematically illustrating a protocol of a negotiation stage or a renegotiation stage according to an embodiment.

FIG. 12 is a flowchart schematically illustrating a protocol of a negotiation stage or a renegotiation stage according to an embodiment.

Referring to FIG. 12, the wireless power transmitter 100 may receive a FOD status data packet (e.g. FOD) from the wireless power receiver 200 (S1210). Here, the wireless power receiver 200 can use the FOD status data packet to inform the wireless power transmitter 100 of the effect its presence has on selected properties of the reference wireless power transmitter 100. And, the wireless power transmitter 100 can configure the FOD function using this information.

The wireless power transmitter 100 may transmit an ACK/NAK for the FOD status data packet to the wireless power receiver 200 (S1215).

Meanwhile, the wireless power receiver 200 may receive an identification data packet (ID), a capabilities data packet (CAP), and an extended CAP (XCAP) of the wireless power transmitter 100 using a general request data packet (GRQ).

The general request packet (GRQ) may have a header value of 0x07 and may include a 1-byte message field. The message field of the general request packet (GRQ) may include a header value of a data packet that the wireless power receiver 200 requests from the wireless power transmitter 100 using the GRQ packet.

For example, in the negotiation phase or renegotiation phase, the wireless power receiver 200 may transmit a GRQ packet (GRQ/id) requesting an ID packet of the wireless power transmitter 100 to the wireless power transmitter 100 (S1220).

The wireless power transmitter 100 that has received the GRQ/id may transmit an ID packet to the wireless power receiver 200 (S1225). The ID packet of the wireless power transmitter 100 includes information about the 'Manufacturer Code'. The ID packet containing information about the 'Manufacturer Code' allows the manufacturer of the wireless power transmitter 100 to be identified.

Or, in the negotiation phase or re-negotiation phase, the wireless power receiver 200 may transmit a GRQ packet (GRQ/cap) requesting a capability packet (CAP) of the wireless power transmitter 100 to the wireless power transmitter 100 (S1230). The message field of GRQ/cap may include the header value (0x31) of the capability packet (CAP).

The wireless power transmitter 100 that has received the GRQ/cap may transmit a capability packet (CAP) to the wireless power receiver 200 (S1235).

Or, in the negotiation phase or re-negotiation phase, the wireless power receiver 200 may transmit a GRQ packet (GRQ/xcap) requesting a capability packet (CAP) of the wireless power transmitter 100 to the wireless power transmitter 100 (S1240). The message field of GRQ/xcap may include the header value (0x32) of the performance packet (XCAP).

The wireless power transmitter 100 that has received GRQ/xcap may transmit a capability packet (XCAP) to the wireless power receiver 200 (S1245).

Figures 13, 14:
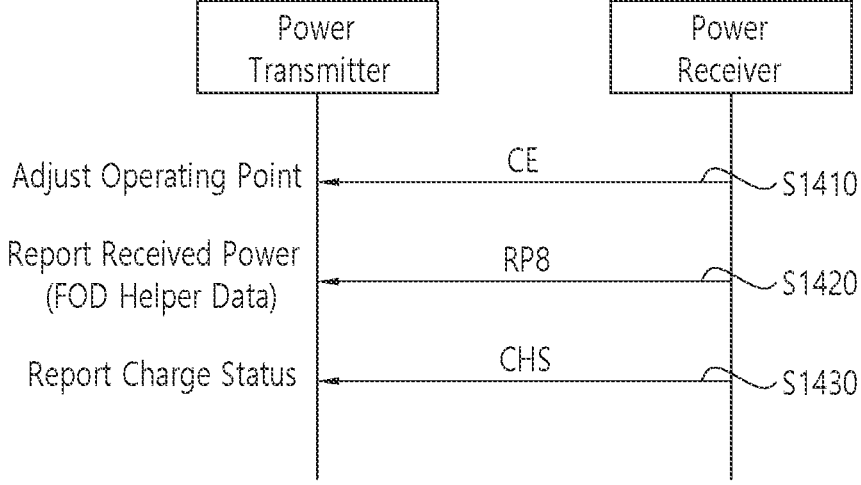
FIG. 13 is a diagram illustrating a message field of a capability packet (CAP) of a wireless power transmission device according to an embodiment.
FIG. 14 schematically shows a flow chart of the data flow for the power transfer phase 840 in the baseline protocol.

FIG. 13 is a diagram illustrating a message field of a capability packet (CAP) of a wireless power transmission device according to an embodiment.

A capability packet (CAP) according to one embodiment may have a header value of 0x31 and, referring to FIG. 13, may include a 3-byte message field.

Referring to FIG. 13, the message field of the capability packet (CAP) may include a 1-bit authentication (AR) flag and a 1-bit outband (OB) flag.

The authentication flag (AR) indicates whether the wireless power transmitter 100 supports the authentication function. For example, if the value of the authentication flag (AR) is '1', it indicates that the wireless power transmitter 100 supports an authentication function or can operate as an authentication responder, if the value of the authentication flag (AR) is '0', it may indicate that the wireless power transmitter 100 does not support the authentication function or cannot operate as an authentication responder.

The outband (OB) flag indicates whether the wireless power transmitter 100 supports outband communication. For example, if the value of the outband (OB) flag is '1', the wireless power transmitter 100 instructs outband communication, if the value of the out-of-band (OB) flag is '0', this may indicate that the wireless power transmitter 100 does not support out-of-band communication.

In the negotiation phase, the wireless power receiver 200 can receive the capability packet (CAP) of the wireless power transmitter 100 and check whether the wireless power transmitter 100 supports the authentication function and whether out-band communication is supported.

Returning to FIG. 12, the wireless power receiver 200 can update the elements of the power transfer contract (Power Transfer Contract) related to the power to be provided in the power transfer phase using at least one specific request packet (SRQ. Specific Request data packet) in the negotiation phase or re-negotiation phase (S1250), ACK/NAK for this can be received (S1255).

Meanwhile, in order to confirm the extended power transfer contract and end the negotiation phase, the wireless power receiver 200 transmits SRQ/en to the wireless power transmitter 100 (S1260), it can receive ACK from the wireless power transmitter 100 (S1265).

4. Power Transfer Phase (840)

The power transfer phase 840 is a part of the protocol in which actual power is transferred to the load of the wireless power receiver 200. Here, power transfer may proceed according to the conditions of the power transfer contract created in the negotiation phase 830.

<Power Control Based on CE>

The wireless power receiver 200 can control the power level by transmitting control error (CE) data that measures the deviation between the target and the actual operating point of the wireless power receiver 200 to the wireless power transmitter 100. The wireless power transmitter 100 and wireless power receiver 200 aim to make the control error data zero, at which point the system will operate at the target power level.

<In-Power Transfer FOD Method>

In addition to control error data, the wireless power transmitter 100 and the wireless power receiver 200 may exchange information to facilitate FOD. The wireless power receiver 200 regularly reports the amount of power it receives (received power level) to the wireless power transmitter 100, the wireless power transmitter 100 may inform the wireless power receiver 200 whether a foreign object has been detected. Methods that can be used for FOD in the power transfer phase may correspond to, for example, power loss calculations. In this approach, the wireless power transmitter 100 compares the received power level reported by the wireless power receiver 200 with the amount of transmitted power (transmitted power level) and it can send a signal (whether a foreign object has been monitored) to the wireless power receiver 200 when the difference exceeds a threshold.

<Renegotiation Phase>

If necessary depending on the situation, the wireless power transmitter 100 or the wireless power receiver 200 may request renegotiation of the power transfer contract during the power transfer phase. Examples of changed circumstances in which renegotiation of a power transfer contract may occur include:

When the wireless power receiver 200 requires (substantially) more power than previously negotiated.

When the wireless power transmitter 100 detects that it is operating at low efficiency.

When the wireless power transmitter 100 can no longer maintain its current power level due to increased operating temperature (Or vice versa, i.e., when the wireless power receiver 200 can operate at a higher power level after sufficiently cooling).

Here, an example of a specific protocol for the renegotiation phase is the same as described above.

<Data Transport Stream>

The wireless power transmitter 100 and the wireless power receiver 200 may start a data transmission stream and exchange application level data throughout the power transfer phase 840.

Here, an important common application is authentication, where each side can verify the other's credentials in a tamper-proof manner. For example, the wireless power receiver 200 may want to check the credentials of the wireless power transmitter 100 to ensure that the wireless power transmitter 100 can be trusted to operate safely at high power levels. Having the appropriate credentials can mean you have passed compliance testing.

Accordingly, the present specification may provide a method of starting power transfer at a low power level and controlling power to a higher level only after successfully completing the authentication protocol.

<Protocol in Power Transfer Phase 840>

So far, the operation between the wireless power transmitter 100 and the wireless power receiver 200 in the power transfer phase 840 has been briefly described. Hereinafter, for a smooth understanding of the operation in the power transfer phase 840, the protocol in the power transfer phase 840 will be described separately as a baseline protocol and an extended protocol.

FIG. 14 schematically shows a flow chart of the data flow for the power transfer phase 840 in the baseline protocol.

According to FIG. 14, the wireless power receiver 200 may transmit CE to the wireless power transmitter 100 (S1410). Here, the wireless power receiver 200 can generally transmit CE data packets several times per second.

The wireless power receiver 200 may generally transmit a received power (RP) data packet (RP8 in the baseline protocol) to the wireless power transmitter 100 once every 1.5 seconds (S1420).

Optionally, the wireless power receiver 200 may transmit a charge status (CHS) data packet to the wireless power transmitter 100 (S1430).

The data packet described above can be summarized and explained as follows.

CE: CE data packets can provide feedback on the desired power level. CE data packets may include a control error value, here, the control error value may be a signed integer value that is a relative measurement value of the deviation between the actual operating point and the target operating point of the wireless power receiver 200. If the control error value at this time is a positive value, it indicates that the actual operating point is below the target operating point, the wireless power transmitter 100 may be requested to increase the power signal. If the control error value is a negative value, it indicates that the actual operating point is above the target operating point, the wireless power transmitter 100 may be requested to reduce the power signal.

RP8: RP8 data packets can report the received power level. Here, RP8 data packets can only be included in the baseline protocol.

CHS: CHS data packets can provide the charge level of the battery at the load.

Figure 15:
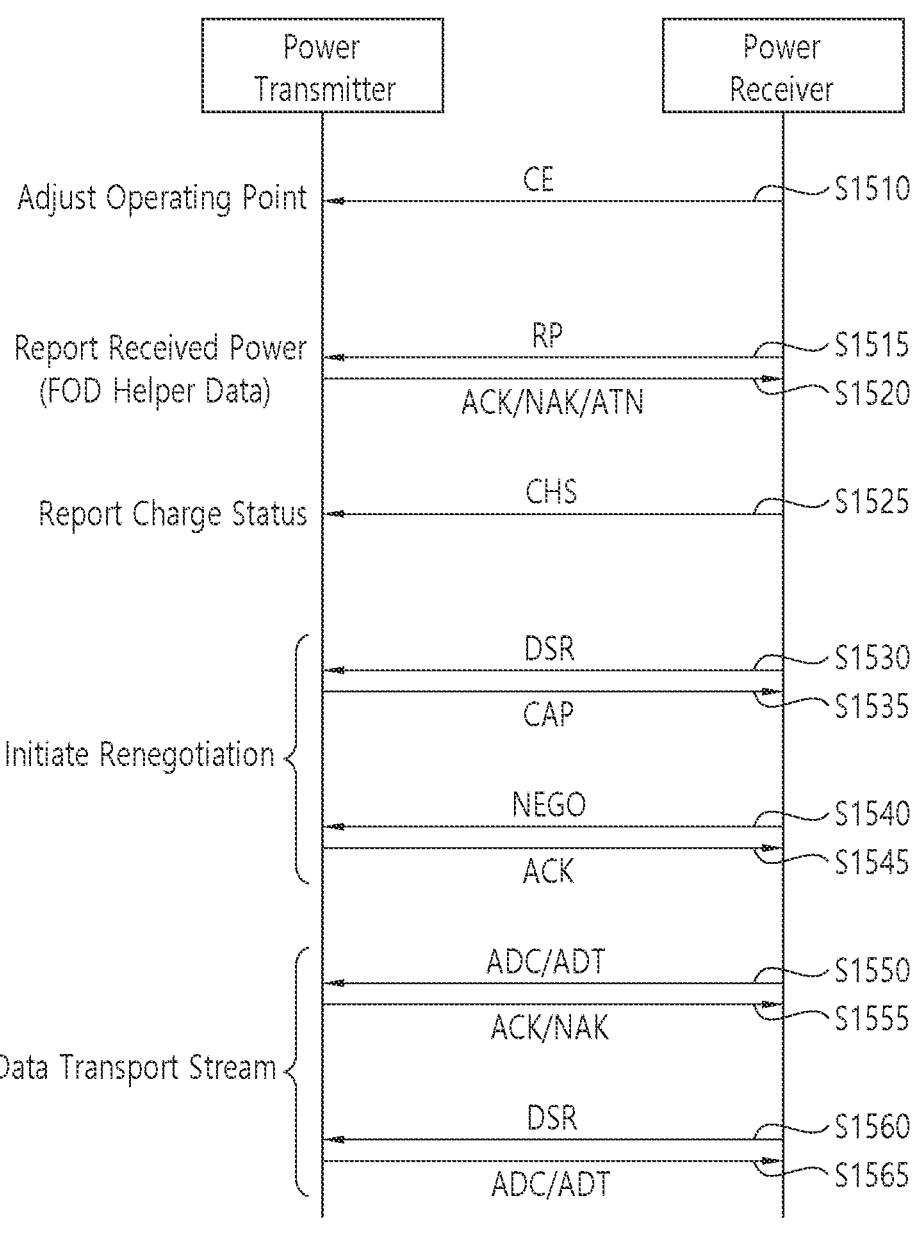
FIG. 15 schematically shows a flow chart of the data flow for the power transfer phase 840 in the extended protocol.

FIG. 15 schematically shows a flow chart of the data flow for the power transfer phase 840 in the extended protocol.

According to FIG. 15, the wireless power receiver 200 may transmit CE to the wireless power transmitter 100 (S1510). Here, the wireless power receiver 200 can generally transmit CE data packets several times per second.

The wireless power receiver 200 may generally transmit a received power (RP) data packet (RP in the extended protocol) to the wireless power transmitter 100 once every 1.5 seconds (S1515).

In the power transfer phase, control error packets (CE) and received power packets (RP) are data packets that must be repeatedly transmitted/received according to the required timing constraints to control wireless power.

The wireless power transmitter 100 can control the level of wireless power transmitted based on the control error packet (CE) and received power packet (RP) received from the wireless power receiver 200.

Meanwhile, in the extended protocol, the wireless power transmitter 100 may respond to the received power packet (RP) with a bit pattern such as ACK, NAK, or ATN (S1520).

The fact that the wireless power transmitter 100 responds with ACK to a received power packet (RP/0) with a mode value of 0 means that power transmission can continue at the current level.

When the wireless power transmitter 100 responds with NAK to a received power packet (RP/0) with a mode value of 0, this means that the wireless power receiver 200 must reduce power consumption.

For received power packets with a mode value of 1 or 2 (RP/1 or RP/2), when the wireless power transmitter 100 responds with ACK, this means that the wireless power receiver 200 has accepted the power correction value included in the received power packet (RP/1 or RP/2).

For received power packets with a mode value of 1 or 2 (RP/1 or RP/2), when the wireless power transmitter 100 responds with NAK, it means that the wireless power receiver 200 did not accept the power correction value included in the received power packet (RP/1 or RP/2).

The received power packet (RP/1) with a mode value of 1 described above may mean the first calibration data point, a received power packet (RP/2) with a mode value of 2 may mean an additional calibration data point. Here, the wireless power receiver may transmit a received power packet (RP/2) with a mode value of 2 to the wireless power transmitter multiple times to transmit a plurality of additional power calibration values, the wireless power transmitter can proceed with a calibration procedure based on the received RP/1 and multiple RP/2.

When the wireless power transmitter 100 responds with ATN to the received power packet (RP), it means that the wireless power transmitter 100 requests permission for communication. That is, the wireless power transmitter 100 may transmit an attention (ATN) response pattern to request permission to transmit a data packet in response to an RP data packet. In other words, the wireless power transmitter 100 may transmit an ATN to the wireless power receiver 200 in response to the RP data packet and request the wireless power receiver 200 for permission to transmit the data packet.

Optionally, the wireless power receiver 200 may transmit a charge status (CHS) data packet to the wireless power transmitter 100 (S1525).

Meanwhile, the wireless power transmitter 100 and the wireless power receiver 200 can exchange data stream response (DSR) data packets, CAP data packets, and NEGO data packets to initiate renegotiation of elements of the power transfer contract (typically guaranteed load power).

For example, the wireless power receiver 200 transmits a DSR data packet to the wireless power transmitter 100 (S1530), the wireless power transmitter 100 may transmit a CAP to the wireless power receiver 200 (S1535).

In addition, the wireless power receiver 200 transmits a NEGO data packet to the wireless power transmitter 100 (S1540), the wireless power transmitter 100 may transmit an ACK to the wireless power receiver 200 in response to the NEGO data packet (S1545).

Here, the data packets related to the start of the renegotiation phase can be summarized as follows.

DSR: Any one of the following values can be set in the DSR data packet.

i) 0x00-DSR/nak: Indicates that the last received data packet of the wireless power transmitter 100 was rejected.

ii) 0x33-DSR/poll: Invite the wireless power transmitter 100 to send a data packet.

iii) 0x55-DSR/nd: Indicates that the last received data packet from the wireless power transmitter 100 was not expected.

iv) 0xFF-DSR/ack: Confirms that the last received data packet of the wireless power transmitter 100 has been properly processed.

CAP: The CAP data packet provides information about the function of the wireless power transmitter 100. The specific details are the same as described previously.

NEGO: NEGO data packets may request the wireless power transmitter 100 to proceed to the re-negotiation phase.

The wireless power transmitter 100 and the wireless power receiver 200 may use auxiliary data transport (ADC), auxiliary data transport (ADT), and DSR data packets to exchange application level data.

That is, from the perspective of transmission and reception of a data transmission stream for exchange of application-level data, the wireless power receiver 200 may transmit ADC/ADT to the wireless power transmitter 100 (S1550), the wireless power transmitter 100 may transmit an ACK/NAK to the wireless power receiver 200 in response (S1555). In addition, the wireless power receiver 200 can transmit DSR to the wireless power transmitter 100 (S1560), the wireless power transmitter may transmit ADC/ADT to the wireless power receiver (S1565).

Here, the data transport stream serves to transfer application-level data from the data stream initiator to the data stream responder. Additionally, application level data can be broadly divided into i) authentication applications, and ii) proprietary (general purpose) applications.

Among application level data, messages/information related to the authentication application can be organized as follows.

The message used in the authentication procedure is called an authentication message. Authentication messages are used to convey information related to authentication. There are two types of authentication messages. One is an authentication request, and the other is an authentication response. An authentication request is sent by an authentication initiator, and an authentication response is sent by an authentication responder. The wireless power transmitting device and receiving device can be an authentication initiator or an authentication responder. For example, if the wireless power transmitting device is the authentication initiator, the wireless power receiving device becomes the authentication responder, and if the wireless power receiving device is the authentication initiator, the wireless power transmitting device becomes the authentication responder.

Authentication request messages include GET_DIGESTS, GET_CERTIFICATE, and CHALLENGE.

GET_DIGESTS: This request can be used to retrieve certificate chain digests. The wireless power receiver 200 can request a desired number of digests at a time.

GET_CERTIFICATE: This request can be used to read segments of the target certificate chain.

CHALLENGE: This request can be used to initiate authentication of a power transmitter product device.

The authentication response message includes DIGESTS, CERTIFICATE, CHALLENGE_AUTH, and ERROR.

DIGESTS: The wireless power transmitter 100 can send a certificate chain summary using the DIGESTS response and report slots containing a valid certificate chain summary.

CERTIFICATE: This response can be used by the wireless power transmitter 100 to send the requested segment of the certificate chain.

CHALLENGE_AUTH: The wireless power transmitter 100 can respond to the CHALLENGE request using CHALLENGE_AUTH.

ERROR: This response can be used to transmit error information from the power transmitter.

The authentication message may be called an authentication packet, authentication data, or authentication control information. Additionally, messages such as GET_DIGEST and DIGESTS may also be called GET_DIGEST packets, DIGEST packets, etc.

Meanwhile, as described above, the wireless power receiver 200 and the wireless power transmitter 100 can transmit application level data through a data transmission stream. Application-level data transmitted through a data transport stream may consist of a data packet sequence with the following structure.

Initial ADC data packet that opens the stream.

i) Types of messages contained in the stream.

ii) Number of data bytes in the stream.

A series of ADT data packets containing the actual message.

The final ADC/end data packet that closes the stream.

Hereinafter, the data transport stream for an example in which the above ADC, ADT, and ADC/end data packets are used will be described using the drawings.

Figure 16:
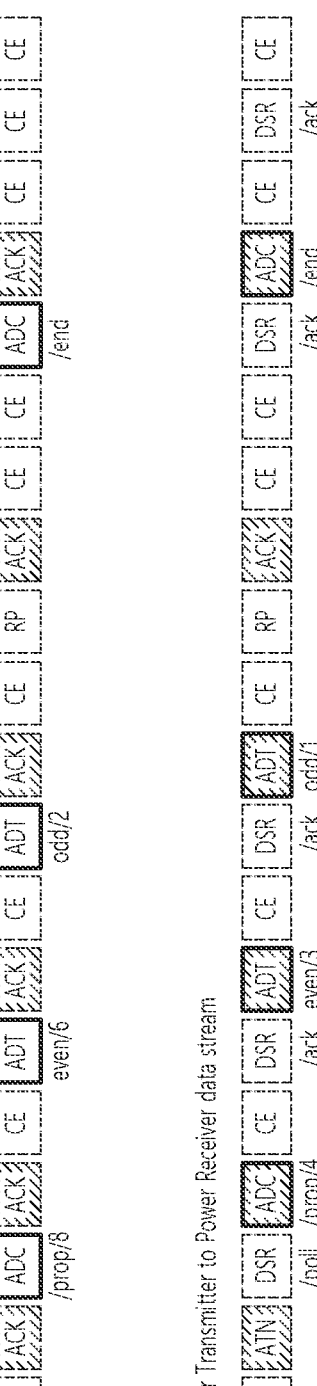
FIG. 16 illustrates an application-level data stream between the wireless power transmitter 100 and the wireless power receiver 200 according to an example.

FIG. 16 illustrates an application-level data stream between the wireless power transmitter 100 and the wireless power receiver 200 according to an example.

Referring to FIG. 16, the data stream may include auxiliary data control (ADC) data packets and/or auxiliary data transport (ADT) data packets.

ADC data packets are used to open a data stream. ADC data packets can indicate the type of message included in the stream and the number of data bytes. On the other hand, ADT data packets are sequences of data containing the actual message. ADC/end data packets are used to signal the end of a stream. For example, the maximum number of data bytes in a data transport stream may be limited to 2047.

ACK or NAC (NACK) is used to notify whether ADC data packets and ADT data packets are normally received. Between the transmission timing of the ADC data packet and the ADT data packet, control information necessary for wireless charging, such as a control error packet (CE) or DSR, may be transmitted.

Using this data stream structure, authentication-related information or other application-level information can be transmitted and received between a wireless power transmitter and a receiver.

An example for understanding the operation between the wireless power transmitter 100 and the wireless power receiver 200 in the power transfer phase 840 described above may be as follows.

Figure 17:
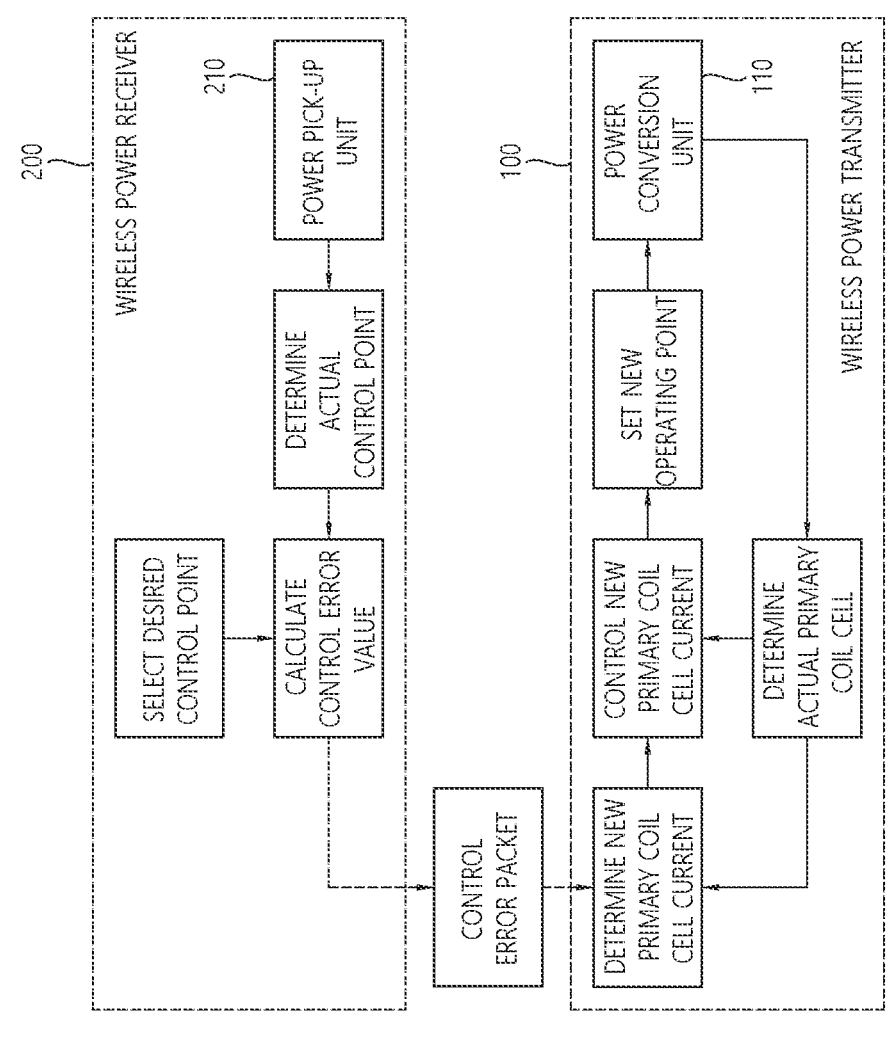
FIG. 17 shows a power control method according to one embodiment.

FIG. 17 shows a power control method according to one embodiment.

In the power transfer phase in FIG. 17, the wireless power transmitter 100 and the wireless power receiver 200 can control the amount of power transferred by performing communication along with power transmission and reception. The wireless power transmitter and wireless power receiver operate at a specific control point. The control point represents the combination of voltage and current provided from the output of the wireless power receiver when power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point amplitude, frequency, and duty cycle—by using the received control error packet, so as to control the power transfer. Therefore, the control error packet may be transmitted/received at a constant time interval during the power transfer phase, and, according to an exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 17 will not be completely excluded. And, additional control of the transmitted power may be performed by using the method of FIG. 17.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of KHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

WPC is designed to exchange various status information and commands related to the wireless charging system in-band. However, in the case of in-band communication, information exchange is relatively slow because it is not a system specifically designed for communication. Accordingly, in-band communication may not be appropriate communication for rapid information exchange and exchanging various information.

Under the above background, a method of exchanging information related to the wireless charging system by combining out-of-band communication (in other words, out-band communication) with a wireless charging system (e.g., in-band communication) is being attempted. As representative out-of-band technologies. NFC and BLE technologies may be candidate technologies.

The BLE connection method in the wireless charging system is explained with a diagram as follows.

Figure 18:
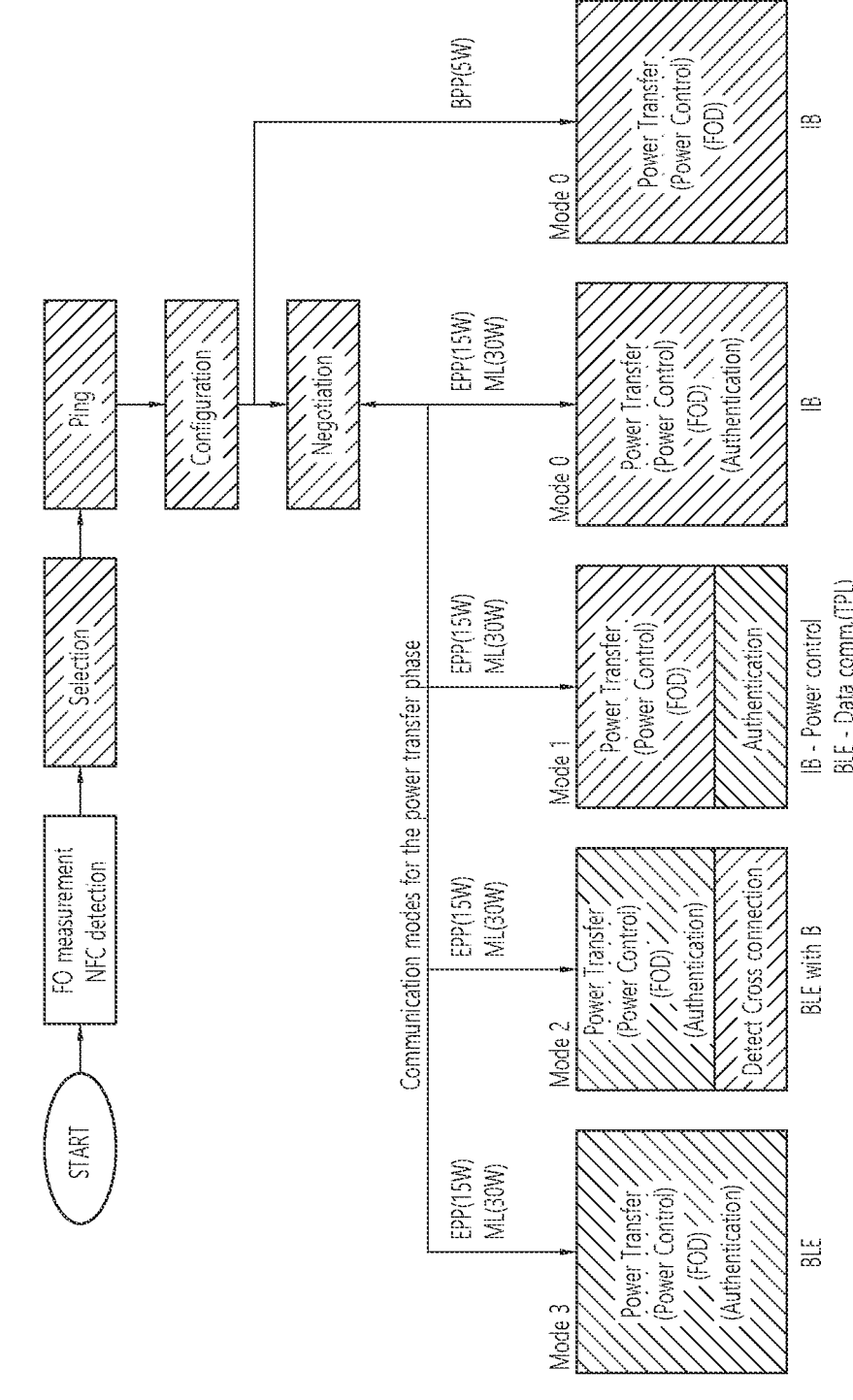
FIG. 18 schematically shows an example of a BLE connection method.

FIG. 18 schematically shows an example of a BLE connection method.

According to FIG. 18, for example, in wireless charging using BLE connection in WPC, various communication modes may exist as follows.

As examples of communication modes, mode 0, mode 1, mode 2, and mode 3 may be provided, and specific examples of these are as follows.

Mode 0 (EPP/BPP): This may correspond to a mode that communicates via IB (Inband), unrelated to BLE.

Mode 1 (IB with BLE): Exchange of power control packets related to charging can be performed through IB, and exchange of data packets (ex. Authentication) can be performed through BLE communication.

Mode 2 (BLE with IB): All packets in actual mode 0, such as charging and data, can be exchanged through BLE, (to prevent cross-connection) the status of devices that are actually charging and communicating with BLE can be periodically checked through IB.

Mode 3 (BLE): All packets, such as charging and data, can be exchanged through BLE, and IB communication may not be used.

At this time, for BLE connection in the wireless charging system, information as shown in the table below can be exchanged between the wireless power transmitter and/or wireless power receiver.

TABLE 2

| Data | Phase | Specific details |
|---|---|---|
| OB(Out of Band) Flag | Configuration phase | Transmits information about whether the wireless power receiver supports Out of Band to the wireless power transmitter. |
| OB(Out of Band) Flag | Negotiation phase | Transmits information about whether the wireless power transmitter supports Out of Band to the wireless power receiver. |
| Wireless Power Receiver BLE Address Packet | Negotiation phase | Transmits BLE address information of wireless power receiver to wireless power transmitter through inband |
| Wireless Power Transmitter BLE Address Packet | Negotiation phase | Transmits BLE address information of wireless power transmitter to wireless power receiver through inband |
| SRQ/communication Packet | Negotiation phase | Transmits information about out-of-band and in-band communication methods |

Figure 19:
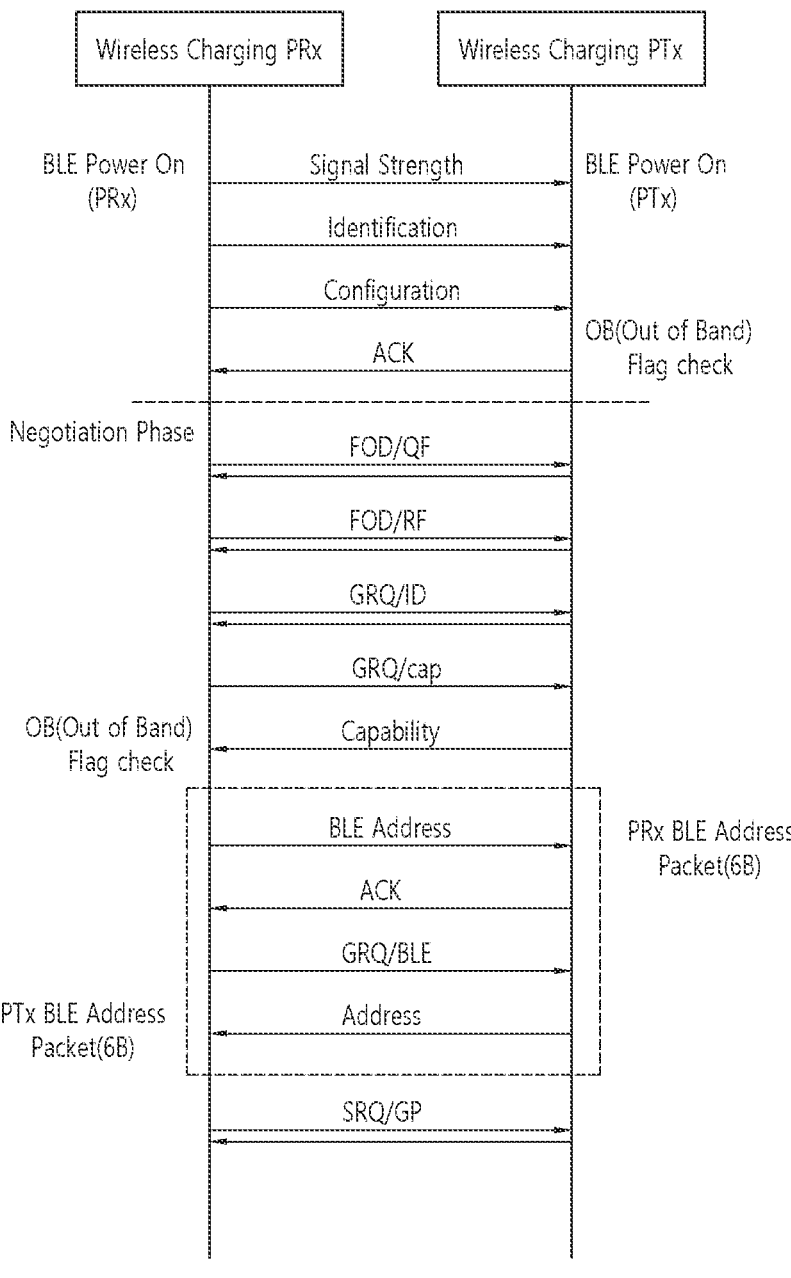
FIGS. 19 and 20 schematically show examples of BLE communication protocol sequences.
Figure 20:
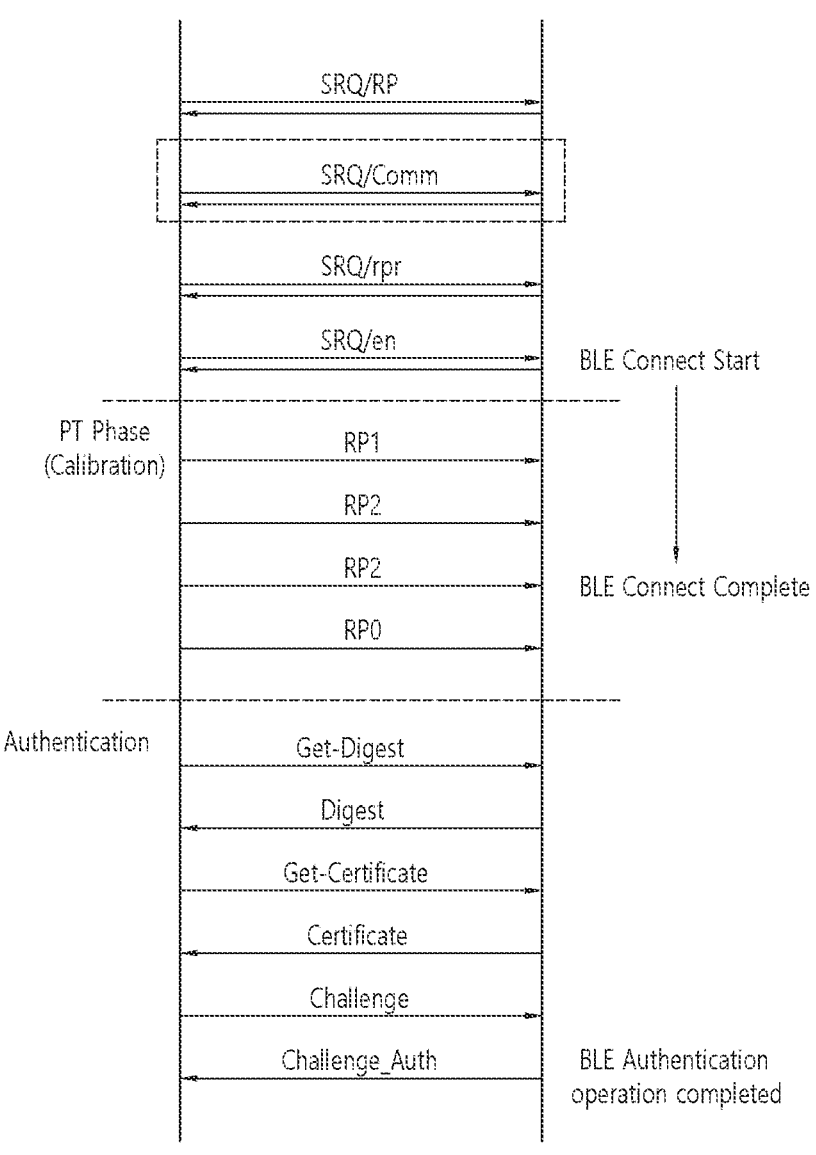

Meanwhile, if explained through the BLE communication protocol sequence, it can be as follows. FIGS. 19 and 20 schematically show examples of BLE communication protocol sequences.

According to FIGS. 19 and 20, the wireless power transmitter may receive a configuration packet (CFG) from the wireless power receiver, for example, in a configuration phase.

At this time, the configuration packet may include information (e.g. OB flag) indicating whether the wireless power receiver supports out-of-band communication, as described above. In addition, indicating that the information in the configuration packet supports out-band communication may, for example, indicate that the wireless power receiver supports BLE communication.

Meanwhile, the wireless power transmitter may transmit a capability packet (CAP) to the wireless power receiver, for example, in a negotiation phase.

At this time, the capability packet may include information (e.g. OB flag) indicating whether the wireless power transmitter supports out-band communication, as described above. In addition, indicating that the information in the capability packet supports out-band communication may, for example, indicate that the wireless power transmitter supports BLE communication.

Additionally, to prevent cross connection, the wireless power transmitter may receive a BLE address related to the wireless power receiver from the wireless power receiver in the negotiation phase.

And, to prevent cross-connection, the wireless power transmitter may transmit a BLE address related to the wireless power transmitter to the wireless power receiver in the negotiation phase.

Afterwards, the wireless power transmitter and wireless power receiver can end the negotiation phase and start a BLE connection. And, at this time, the BLE connection may be completed, for example, in the power transfer phase (PT phase).

And, for example, an authentication procedure may be performed between the wireless power transmitter and/or wireless power receiver through BLE communication. Here, the specific details of the authentication procedure are as described above.

Meanwhile, in the conventional case, only power control through in-band communication, as described above, is supported, and specific details on how to perform power control through out-band communication are not provided.

The problem at this time is maximized when one wireless power transmitter performs power control with, for example, multiple wireless power receivers, and an example of the problem is explained through the drawings as follows.

Figure 21:
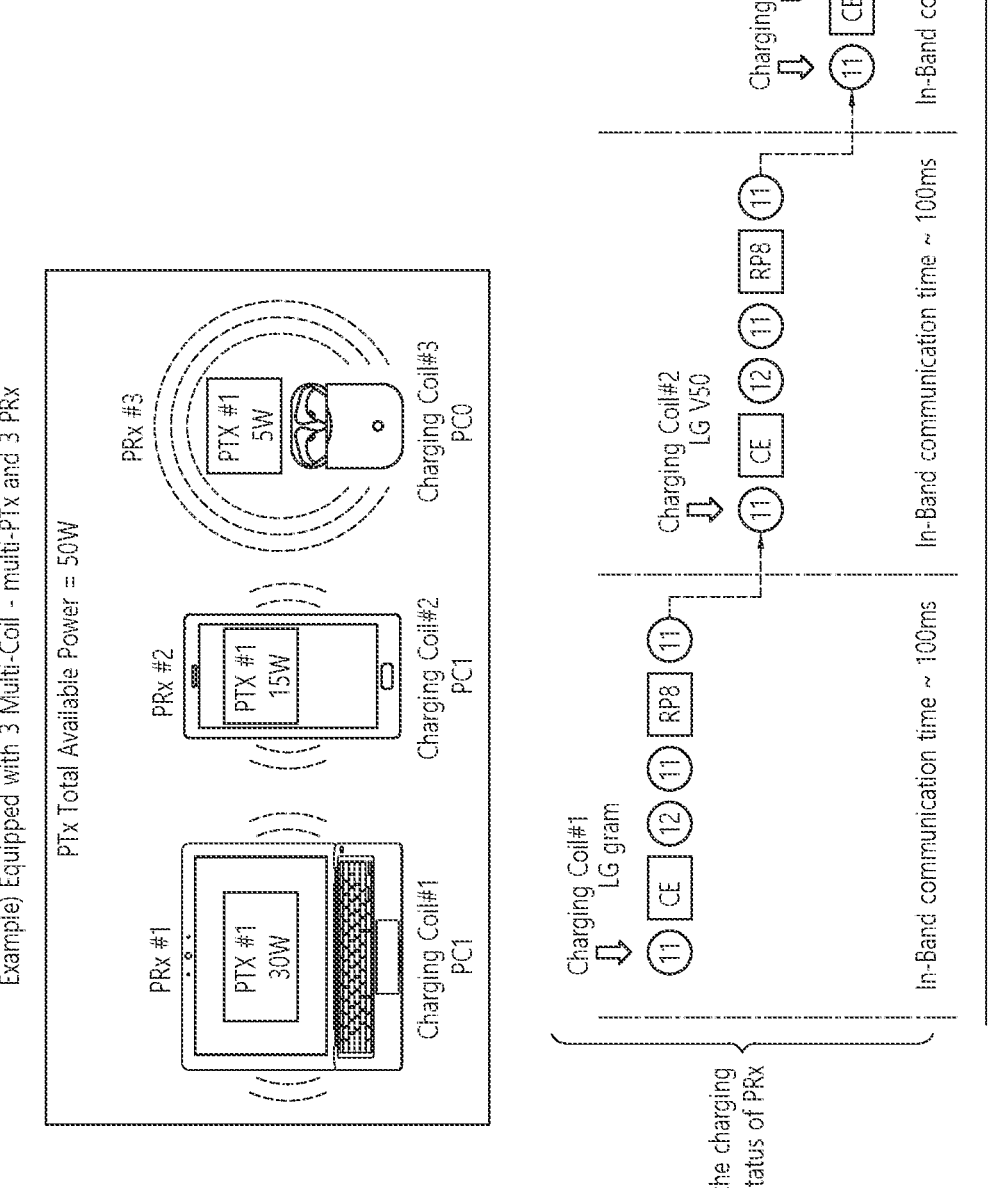
FIG. 21 schematically shows an example in which one wireless power transmitter performs power control with multiple wireless power receivers.

FIG. 21 schematically shows an example in which one wireless power transmitter performs power control with multiple wireless power receivers.

According to FIG. 21, for example, it can be assumed that one wireless power transmitter is equipped with a new multi-coil. And, one wireless power transmitter can perform wireless charging with three wireless power receivers.

In this situation, when the wireless power transmitter supports multiple coils, multiple wireless power receivers can transmit power status to the wireless power transmitter at irregular times. And, the wireless power receivers may transmit different requests to the wireless power transmitter. At this time, it is difficult to manage fast and efficient charging with low-speed in-band communication that only allows 1:1 connection.

That is, according to the conventional in-band communication sequence in the multi-coil wireless power transmitter in the power transfer phase, the wireless power transmitter sequentially exchanges in-band information with each wireless power receiver, this can cause significant delays.

For example, as shown in FIG. 21, the wireless power transmitter may receive a CE packet and/or an RP8 packet from charging coil #1 to wireless power receiver #1 and a power transfer phase. The in-band communication time at this time may take up to approximately 100 ms. Thereafter, the wireless power transmitter may receive a CE packet and/or RP8 packet from charging coil #2 to wireless power receiver #2 and a power transfer phase. The in-band communication time at this time may take up to approximately 100 ms. Thereafter, the wireless power transmitter may receive a CE packet and/or RP8 packet from the charging coil #3 to the wireless power receiver #3 and the power transfer phase. The in-band communication time at this time may take up to approximately 100 ms.

That is, when a wireless power transmitter performs power control with multiple wireless power receivers, rather than performing power control on multiple wireless power receivers at once, power control is performed with the wireless power receivers one at a time sequentially. Accordingly, a significant delay may occur in power control.

In order to prevent the above delay, this specification seeks to provide a configuration in which a wireless power receiver performs power control with at least one wireless power receiver at a time through BLE communication.

In particular, by utilizing BLE ISO (isochronous) channel-based out-band communication that supports connections at high transmission speeds, this specification seeks to provide a configuration in which a wireless power transmitter performs power control with at least one wireless power receiver at a time.

Additionally, by varying the aspect of BLE ISO (isochronous) channel-based out-band communication depending on the channel environment, this specification also seeks to provide a configuration that is adaptive to the channel environment and simultaneously performs power control.

The following drawings were prepared to explain a specific example of the present specification. Since the names of specific devices or specific signals/messages/fields described in the drawings are provided as examples, the technical features of this specification are not limited to the specific names used in the drawings below.

FIG. 22 is a flowchart of a method for transmitting wireless power, according to an embodiment of the present specification.

According to FIG. 22, the wireless power transmitter may receive a configuration packet indicating the availability of OB (out of band) in the setup phase from at least one wireless power receiver (S2210). Here, the configuration packet may correspond to the CFG packet described above. And, the availability of the OB can be indicated by the OB flag included in the CFG packet. As previously explained, if the value of the outband (OB) flag is '1', it indicates that the wireless power receiving device supports outband communication, and if the value of the outband (OB) flag is '0', the wireless power receiving device indicates that the wireless power receiving device supports outband communication. It can indicate that out-of-band communication is not supported. Of course, conversely, if the value of the outband (OB) flag is '0', it indicates that the wireless power receiver supports outband communication, if the value of the outband (OB) flag is '1', it may indicate that the wireless power receiving device does not support outband communication. At this time out-of-band communication may mean, for example, BLE communication.

Thereafter, the wireless power transmitter may transmit a capability packet indicating availability of the OB to the at least one wireless power receiver in the negotiation phase (S2220). Here, the capability packet may correspond to the CAP packet described previously. And, the availability of the OB can be indicated by the OB flag included in the CAP packet.

As described previously, if the value of the outband (OB) flag is '1', it indicates that the wireless power transmitter supports outband communication, if the value of the outband (OB) flag is '0', it may indicate that the wireless power transmitter does not support outband communication. Of course, conversely, if the value of the outband (OB) flag is '0', it indicates that the wireless power transmitter supports outband communication, if the value of the outband (OB) flag is '1', it may indicate that the wireless power transmitter does not support outband communication. At this time, out-of-band communication may mean, for example, BLE communication.

The wireless power transmitter may establish a Bluetooth low energy (BLE) connection with the at least one wireless power receiver based on the configuration packet and the capability packet (S2230). At this time, the BLE connection may be a connection based on the BLE ISO (isochronous) channel, application examples of connection based on the BLE ISO (isochronous) channel and specific details about the connection procedure based on the BLE ISO (isochronous) channel will be described later.

Through the BLE connection, the wireless power transmitter can exchange at least one power control data with the at least one wireless power receiver within at least one sub-event included in the interval of the BLE ISO channel.

In other words, according to this specification, the advantages of BLE Isochronous Channel-based OOB, which can connect multiple wireless power transmitters and wireless power receivers at high transmission speeds (~2 Mbps), can be utilized. In other words, dynamic packet exchange for power control can be supported by utilizing the BLE ISO channel. In addition, adaptive control between the wireless power transmitter and the wireless power receiver according to the load variation (change in wireless power receiver power consumption) of the wireless power receiver can be supported through dynamic packets.

Here, the wireless power transmitter may have a central role in the BLE Isochronous Channel, and one or more wireless power receivers may have a peripheral role in the BLE Isochronous Channel.

Dynamic packets can be transmitted and received periodically according to Load Variation. An example of transmitting and receiving a dynamic packet through in-band and an example of transmitting and receiving a dynamic packet through BLE are explained with the help of the drawings as follows.

FIG. 23 shows an example of transmitting and receiving a dynamic packet through in-band. And, FIGS. 24 and 25 show examples of transmitting and receiving dynamic packets through BLE.

According to FIG. 23, an example may be provided in which one wireless power transmitter has, for example, three coils and transmits power to three wireless power receivers. That is, an example is shown in which one wireless power transmitter performs power control with three wireless power receivers through in-band.

Here, as shown, in the in-Band Communication Sequence in a Multi-Coil Power Transmitter in Power Transfer Phase, the delay caused by the sequential in-band information exchange between the wireless power transmitter and each wireless power receiver can be large. To summarize, it can be as follows.

When using in-band, the wireless power receiver may be able to transmit and receive dynamic packets at approximately 50 ms intervals, and the wireless power transmitter may be able to transmit and receive dynamic packets at 100 ms intervals.

In FIGS. 24 and 25, an example of one wireless power transmitter performing power control with three wireless power receivers through BLE is shown.

Here, as shown in FIG. 24, in the BLE OOB Communication Sequence in a Multi-Coil Power Transmitter in Power Transfer Phase, the wireless power transmitter and at least one wireless power receiver can perform power control at quick intervals (minimum interval 1 ms) through the BLE Isochronous Channel. Accordingly, rapid information exchange between a wireless power transmitter and a plurality of wireless power receivers can be provided. To summarize, it can be as follows.

Through the proposed BLE Isochronous channel-based OOB, it may be possible to transmit and receive at least one dynamic packet at an interval of at least 1 ms.

As shown in FIG. 25, dynamic packets can be periodically transmitted and received through BLE OOB according to the load variation of the wireless power receiver.

Here, with the proposed BLE Isochronous channel-based OOB, it may be possible to transmit and receive at least one dynamic packet at intervals of at least 1 ms. According to this, it may be possible to transmit one or multiple In-Band Qi packets as one BLE OOB packet. Here, the central can be either a wireless power transmitter or a wireless power receiver.

At this time, the transmission order within one ISO interval may be 1) the wireless power transmitter transmits after the wireless power receiver transmits, or conversely 2) the wireless power receiver transmits after the wireless power transmitter transmits.

Hereinafter, for a more detailed understanding of the present specification, the configurations provided in the present specification will be separately described and explained in detail.

1. Structure of BLE Packet

Figure 26:
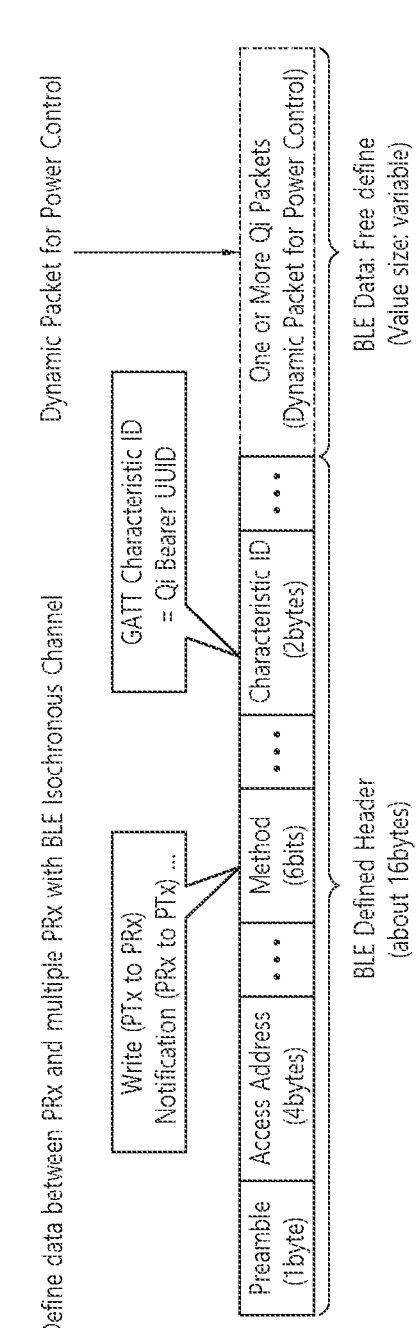
FIG. 26 is an example of data exchanged between a wireless power transmitter and a plurality of wireless power receivers through the BLE ISO channel.

FIG. 26 is an example of data exchanged between a wireless power transmitter and a plurality of wireless power receivers through the BLE ISO channel.

According to FIG. 26, dynamic packets exchanged between a wireless power transmitter and at least one wireless power receiver may be provided through BLE. The dynamic packet at this time can be called a BLE packet, and the BLE packet here can be exchanged not only through the existing BLE channel, but also through the BLE ISO channel.

The BLE packet may include, for example, a preamble field, an access address field, a 'Method' field, and/or at least one Qi packet. And, at least one Qi packet may be a dynamic packet for power control provided in this specification.

Through this, the wireless power transmitter can receive dynamic packets (measurement and request DC volt values, etc.) from multiple wireless power receivers through BLE OOB, afterwards, the wireless power transmitter can adjust the wireless power transmitter Coil Current to match the power requested by the wireless power receiver.

At this time, the types of dynamic packets for power control may be provided as shown in the table below.

TABLE 3

| Header | Packet Type | Message Size |
|--------|-------------|--------------|
| 0x27 | PRx DC voltage received measured value | 1 |
| 0x28 | PRx DC voltage required value | 1 |
| 0x29 | PTx Coil current measured average value | 1 |
| 0x30 | New PTx Coil Current value by required PRx DC voltage and PTx Coil average current | 1 |

In short, the wireless power transmitter and wireless power receiver can transmit and/or receive BLE packets through out-of-band communication (e.g., BLE communication). And, before exchanging BLE packets between the wireless power transmitter and/or wireless power receiver, out-of-band communication may be established. Also, establishment of out-band communication at this time may be performed based on the configuration packet in the setup phase and/or the capability packet in the negotiation phase, as described above. At this time, the BLE packet may include, for example, a Qi packet. For example, the Qi packet may include the CE packet and/or RP packet described above. And, specific examples of CE packets and/or RP packets are the same as described above.

Meanwhile, it was previously explained that the above BLE packets can also be exchanged through the BLE ISO channel. Below, the procedure for establishing a BLE ISO channel for exchanging BLE packets will be described in more detail.

2. Establishment of BLE ISO (Isochronous) Channel

Hereinafter, setting of Isochronous (ISO) Channels and transmission of power control packets will be described.

Figure 27:
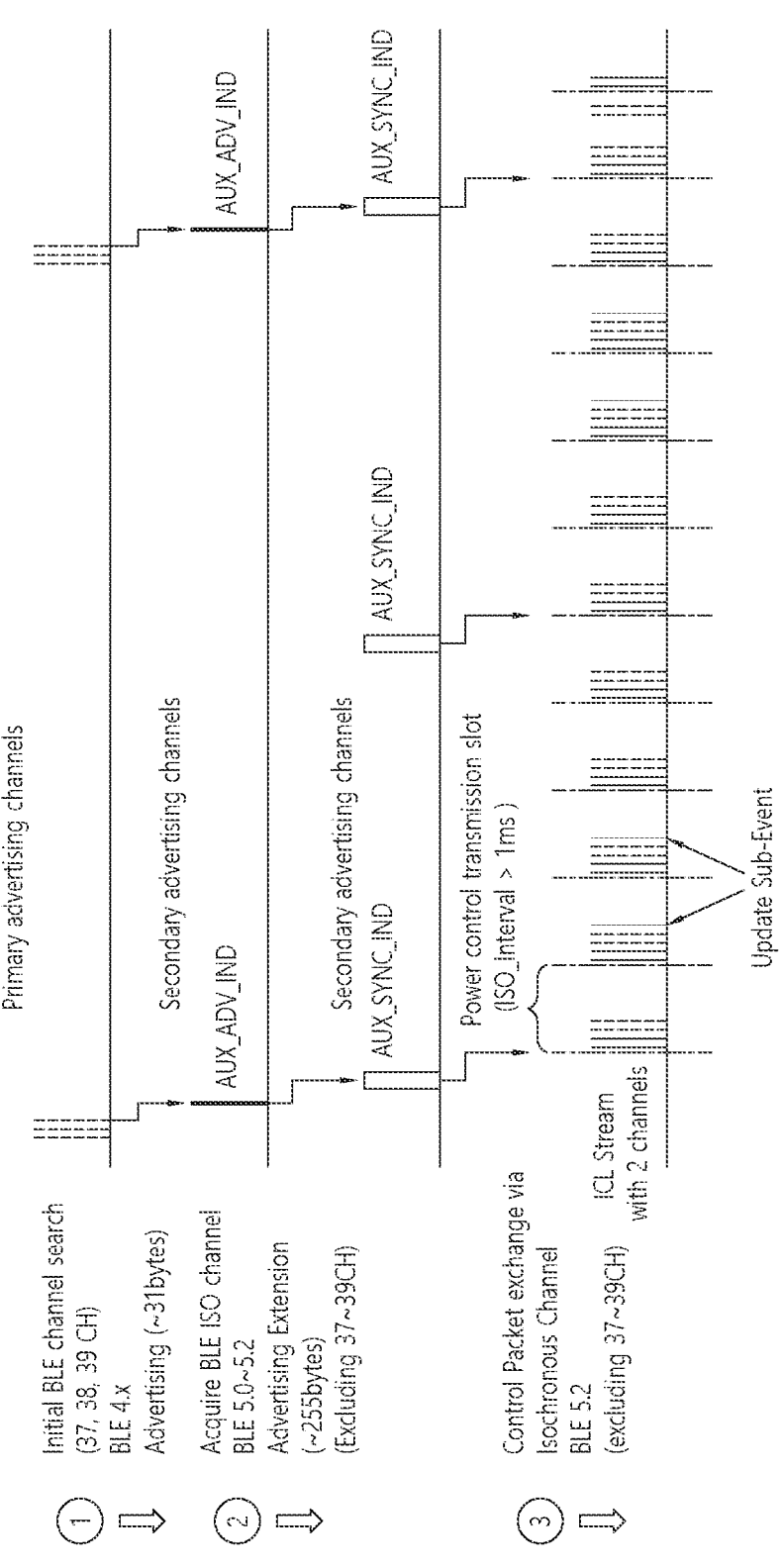
FIG. 27 schematically shows the establishment sequence of a BLE ISO (isochronous) channel.

FIG. 27 schematically shows the establishment sequence of a BLE ISO (isochronous) channel.

According to FIG. 27, establishment of a BLE ISO channel can be performed through the following procedures.

(1) Initial BLE channel search (37, 38, 39 CH) BLE 4.x Advertising (~31 bytes)

(2) BLE ISO channel acquisition BLE 5.0~5.2 Advertising Extension (~255 bytes) (excluding 37~39CH)

(3) Control packet exchange through Isochronous Channel BLE 5.2 (excluding 37~39CH)

Here, the ISO CH frequency can be acquired through initial BLE Advertising.

Additionally, isochronous CH information (frequency, schedule information, etc.) can be obtained by utilizing the Advertising Extension of BT 5.0. Afterwards, periodic power control packets can be broadcast using the Periodic Advertising Extension of BT 5.0.

Figure 28:
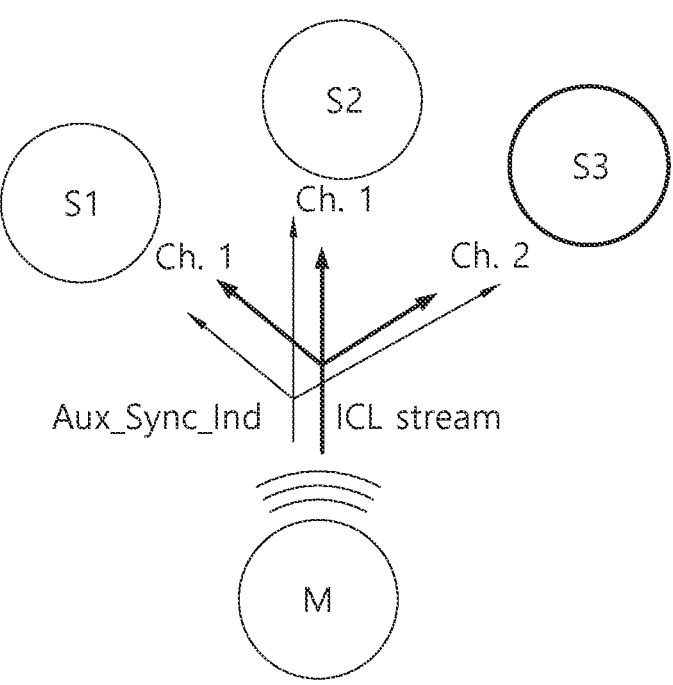
FIG. 28 shows examples of central devices and peripheral devices.

FIG. 28 shows examples of central devices and peripheral devices.

As shown in FIG. 28, the broadcast device can be defined as central. That is, when the procedure in FIG. 27 is performed, the broadcasting device may be defined as central as shown in FIG. 28.

If the BLE ISO channel is established, a specific method is needed on how data packets will be transmitted and received through the BLE ISO channel. Accordingly, the contents thereof will be explained through drawings.

3. Communication Between Wireless Power Transmitter and Multiple Wireless Power Receivers Via BLE ISO Channel According to this specification, a method of fast data exchange can be provided in various ways by utilizing OOB based on BLE Isochronous Channel, which allows connection between multiple wireless power transmitters and wireless power receivers.

At this time, by distinguishing whether the data of the wireless power receiver or the wireless power transmitter will be transmitted and received first, the communication method between a wireless power transmitter and multiple wireless power receivers through the BLE ISO channel can be described as follows.

(1) Priority Transmission and Reception of Data on Wireless Power Receivers

1) Option 1

FIG. 29 schematically shows an example in which data of the wireless power receiver is transmitted and received first according to option 1.

According to FIG. 29, data from the wireless power transmitter and all wireless power receivers within the subevent can be sequentially transmitted. That is, wireless power transmitter data and multiple wireless power receiver (sequential) data can be transmitted within one subevent. In other words, the wireless power transmitter may sequentially transmit or receive power control data of the wireless power transmitter or power control data of at least one wireless power receiver on a sub-event basis.

More specifically, for example, when there is no ACK/NAK transmission from the wireless power transmitter, in one sub-event, the wireless power transmitter may receive data packets for each of the at least one wireless power receiver from the at least one wireless power receiver. And, in a sub-event after the above one sub-event, the wireless power transmitter may transmit the data packet of the wireless power transmitter to at least one wireless power receiver.

For example, when there is ACK/NAK transmission from a wireless power transmitter, in one sub-event, the wireless power transmitter may receive data packets for each of the at least one wireless power receiver from the at least one wireless power receiver. In addition, after receiving data packets from each of at least one wireless power receiver in the above sub-event, the wireless power transmitter may transmit an ACK/NAK for the received data packet to the at least one wireless power receiver.

Here, in a sub-event following the above one sub-event, the wireless power transmitter may transmit the data packet of the wireless power transmitter to at least one wireless power receiver.

Here, Option 1 supports multiple wireless power receivers transmitting packets within one sub-event. Therefore, when following option 1, the number of sub-events is smaller than when following option 2 or option 3, which will be described later.

Accordingly, in the case of option 1, the number of sub-events is small, so hardware power consumption due to changing sub-events and managing sub-events is small.

Also, when following option 1, the number of sub-events is small, so the transmission delay is shorter than when following option 2 or option 3, which will be described later. Additionally, the transmission interval between packets, which affects control latency, is short. Additionally, spacing between sub-events and between packets (inter frame spacing (IFS)) is smaller than option 2 or option 3.

That is, according to option 1, if the same number of wireless power receivers exist, there may be advantages in terms of transmission delay and/or power consumption compared to other options.

2) Option 2

FIG. 30 schematically shows an example in which data of the wireless power receiver is transmitted and received first according to option 2.

According to FIG. 30, a subevent section is allocated to each wireless power receiver, and data can be transmitted for each wireless power receiver. The wireless power transmitter can transmit data per subevent. That is, a subevent section is allocated to each wireless power receiver, and data packets can be transmitted in Request-Response format between the wireless power transmitter and multiple wireless power receivers. In other words, the wireless power transmitter may transmit or receive power control data of the wireless power transmitter or power control data of at least one wireless power receiver in a request and response format within each of at least one sub-event.

More specifically, for example, when there is no ACK/NAK transmission from the wireless power transmitter, the wireless power transmitter may receive a data packet of the first wireless power receiver from the first wireless power receiver in the first sub-event. And, the wireless power transmitter may transmit the data packet of the wireless power transmitter to the first wireless power receiver in the first sub-event. Thereafter, the wireless power transmitter may receive a data packet of the second wireless power receiver from the second wireless power receiver in the second sub-event. And, the wireless power transmitter may transmit the data packet of the wireless power transmitter to the second wireless power receiver in the second sub-event. Afterwards, the wireless power transmitter may receive a data packet of the third wireless power receiver from the third wireless power receiver in the third sub-event. And, the wireless power transmitter may transmit the data packet of the wireless power transmitter to the third wireless power receiver in the third sub-event.

For example, when there is an ACK/NAK transmission from the wireless power transmitter, the wireless power transmitter transmits the data packet of the wireless power transmitter to the first wireless power receiver within the first sub-event, within the first sub-event, the wireless power transmitter may receive a data packet from the first wireless power receiver. Thereafter, within the second sub-event, the wireless power transmitter transmits the data packet of the wireless power transmitter to the second wireless power receiver, within the second sub-event, the wireless power transmitter may receive a data packet from the second wireless power receiver. Thereafter, within the third sub-event, the wireless power transmitter transmits the data packet of the wireless power transmitter to the third wireless power receiver, within the third sub-event, the wireless power transmitter may receive a data packet from the third wireless power receiver. Thereafter, in the sub-event located after (for example, immediately after) the first, second, and third sub-events, the wireless power transmitter may transmit a data packet of the wireless power transmitter to at least one wireless power receiver.

3) Option 3

FIG. 31 schematically shows an example in which data of the wireless power receiver is transmitted and received first according to option 3.

According to FIG. 31, a subevent section is allocated to each wireless power receiver, and data can be transmitted for each wireless power receiver. The wireless power transmitter can transmit data only in the first subevent within the ISO interval. That is, a subevent section can be assigned to each wireless power receiver, the wireless power transmitter can transmit data only in the last subevent, and data can be transmitted for each wireless power receiver per subevent. In other words, the wireless power transmitter receives each of the power control data of the at least one wireless power receiver within each of the at least one sub-event, immediately after at least one sub-event or within the first of the at least one sub-event, the wireless power transmitter may transmit power control data of the wireless power transmitter to at least one wireless power receiver.

More specifically, for example, when there is no ACK/NAK transmission from the wireless power transmitter, the wireless power transmitter may receive a data packet of the first wireless power receiver from the first wireless power receiver in the first sub-event. Thereafter, the wireless power transmitter may receive a data packet of the second wireless power receiver from the second wireless power receiver in the second sub-event. Afterwards, the wireless power transmitter may receive a data packet of the third wireless power receiver from the third wireless power receiver in the third sub-event. And, after the first sub-event, the second subevent, and the third sub-event, the wireless power transmitter may transmit the data packet of the wireless power transmitter to at least one wireless power receiver.

For example, when the wireless power transmitter transmits ACK/NAK, the wireless power transmitter may also transmit the ACK/NAK when transmitting the data packet of the wireless power transmitter to at least one wireless power receiver.

(2) Priority Transmission and Reception of Data to Wireless Power Transmitter

1) Option 1

FIG. 32 schematically shows an example in which data of the wireless power transmitter is transmitted and received first according to option 1.

According to FIG. 32, data from the wireless power transmitter and all wireless power receivers within the subevent can be sequentially transmitted. That is, wireless power transmitter data and multiple wireless power receiver (sequential) data can be transmitted within one subevent. In other words, the wireless power transmitter may sequentially transmit or receive power control data of the wireless power transmitter or power control data of at least one wireless power receiver on a sub-event basis.

More specifically, for example, when there is no ACK/NAK transmission from the wireless power transmitter, the wireless power transmitter may transmit the data packet of the wireless power transmitter to at least one wireless power receiver in one sub-event. And, in the above sub-event, the wireless power transmitter may receive data packets for each of the at least one wireless power receiver from the at least one wireless power receiver.

For example, when the wireless power transmitter transmits an ACK/NAK, the wireless power transmitter may transmit the data packet of the wireless power transmitter to at least one wireless power receiver in one sub-event. And, in the above sub-event, the wireless power transmitter may receive data packets for each of the at least one wireless power receiver from the at least one wireless power receiver.

Here, in a sub-event following the above one sub-event, the wireless power transmitter may transmit an ACK/NAK of a data packet for at least one wireless power receiver to at least one wireless power receiver.

Here, Option 1 supports multiple wireless power receivers transmitting packets within one sub-event. Therefore, when following option 1, the number of sub-events is smaller than when following option 2 or option 3, which will be described later.

Accordingly, in the case of option 1, the number of sub-events is small, so hardware power consumption due to changing sub-events and managing sub-events is small.

Also, when following option 1, the number of sub-events is small, so the transmission delay is shorter than when following option 2 or option 3, which will be described later. Additionally, the transmission interval between packets, which affects control latency, is short. Additionally, spacing between sub-events and between packets (inter frame spacing (IFS)) is smaller than option 2 or option 3.

That is, according to option 1, if the same number of wireless power receivers exist, there may be advantages in terms of transmission delay and/or power consumption compared to other options.

2) Option 2

FIG. 33 schematically shows an example in which data of the wireless power transmitter is transmitted and received first according to option 2.

According to FIG. 33, a subevent section is allocated to each wireless power receiver, and data can be transmitted for each wireless power receiver. The wireless power transmitter can transmit data per subevent. That is, a subevent section is allocated to each wireless power receiver, and data packets can be transmitted in Request-Response format between the wireless power transmitter and multiple wireless power receivers. In other words, the wireless power transmitter may transmit or receive power control data of the wireless power transmitter or power control data of at least one wireless power receiver in a request and response format within each of at least one sub-event.

More specifically, for example, when there is no ACK/NAK transmission from the wireless power transmitter, the wireless power transmitter may transmit the data packet of the wireless power transmitter to the first wireless power receiver in the first sub-event. And, the wireless power transmitter may receive a data packet of the first wireless power receiver from the first wireless power receiver in the first sub-event. Thereafter, the wireless power transmitter may transmit the data packet of the wireless power transmitter to the second wireless power receiver in the second sub-event. And, the wireless power transmitter may receive a data packet of the second wireless power receiver from the second wireless power receiver in the second sub-event. Thereafter, the wireless power transmitter may transmit the data packet of the wireless power transmitter to the third wireless power receiver in the third sub-event. And, the wireless power transmitter may receive a data packet of the third wireless power receiver from the third wireless power receiver in the third sub-event.

For example, when there is an ACK/NAK transmission from the wireless power transmitter, the wireless power transmitter transmits the data packet of the wireless power transmitter to the first wireless power receiver within the first sub-event, within the first sub-event, the wireless power transmitter may receive a data packet from the first wireless power receiver. Thereafter, within the second sub-event, the wireless power transmitter transmits the data packet of the wireless power transmitter to the second wireless power receiver, within the second sub-event, the wireless power transmitter may receive a data packet from the second wireless power receiver. Thereafter, within the third sub-event, the wireless power transmitter transmits the data packet of the wireless power transmitter to the third wireless power receiver, within the third sub-event, the wireless power transmitter may receive a data packet from the third wireless power receiver. Thereafter, in the sub-event located after (for example, immediately after) the first, second, and third sub-events, the wireless power transmitter may transmit a data packet of the wireless power transmitter to at least one wireless power receiver.

3) Option 3

FIG. 34 schematically shows an example in which data of the wireless power transmitter is transmitted and received first according to option 3.

According to FIG. 34, a subevent section is allocated to each wireless power receiver, and data can be transmitted for each wireless power receiver. The wireless power transmitter can transmit data only in the first subevent within the ISO interval. That is, a subevent section can be assigned to each wireless power receiver, the wireless power transmitter can transmit data only in the first subevent, and data can be transmitted for each wireless power receiver per subevent. In other words, the wireless power transmitter receives each of the power control data of the at least one wireless power receiver within each of the at least one sub-event, immediately after at least one sub-event or within the first of the at least one sub-event, the wireless power transmitter may transmit power control data of the wireless power transmitter to at least one wireless power receiver.

More specifically, for example, when there is no ACK/NAK transmission from the wireless power transmitter, the wireless power transmitter may transmit a data packet of the wireless power transmitter to at least one wireless power receiver in the first sub-event (first sub-event). And, the wireless power transmitter may receive a data packet of the first wireless power receiver from the first wireless power receiver in the first sub-event. Thereafter, the wireless power transmitter may receive a data packet of the second wireless power receiver from the second wireless power receiver in the second sub-event. Afterwards, the wireless power transmitter may receive a data packet of the third wireless power receiver from the third wireless power receiver in the third sub-event.

For example, when there is ACK/NAK transmission from a wireless power transmitter, the wireless power transmitter may transmit ACK/NAK to at least one wireless power receiver in sub-events following the first sub-event, second sub-event, and third sub-event.

(3) Example of Comparison with Existing Technology

An example of the communication method between a wireless power transmitter and multiple wireless power receivers through the BLE ISO channel described above, compared to existing technology, may be explained with the help of a drawing as follows.

Figure 35:
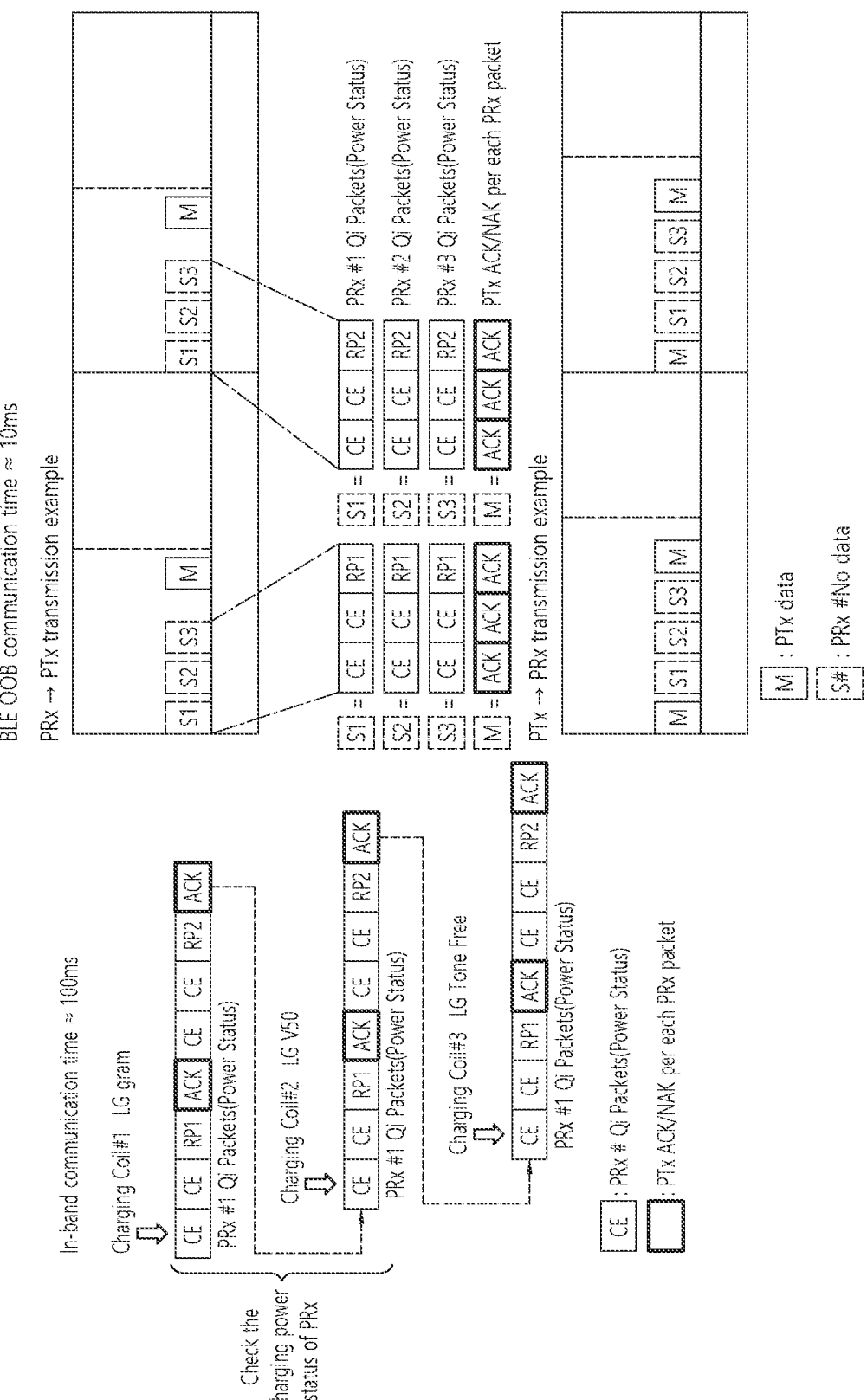
FIG. 35 schematically shows an example of communication between a wireless power transmitter and multiple wireless power receivers through the BLE ISO channel.

FIG. 35 schematically shows an example of communication between a wireless power transmitter and multiple wireless power receivers through the BLE ISO channel.

In FIG. 35, the difference from the prior art is shown based on the example of Option 1 described above.

On the left side of FIG. 35, exchange of data packets according to existing technology is schematically shown. And, as explained previously, in the In-Band Communication Sequence in a Multi-Coil Power Transmitter in Power Transfer Phase, a significant delay may occur due to the sequential in-band information exchange between the wireless power transmitter and each wireless power receiver.

On the right side of FIG. 35, the exchange of data packets according to option 1 is schematically shown. And, as described above, wireless power transmitter data and multiple wireless power receivers can transmit data (sequentially) within one subevent.

Here, in the example on the left of FIG. 35, it may take about 100 ms for data packets to be exchanged. And, in the example of FIG. 35, it may take only about 10 ms for data packets to be exchanged.

That is, according to the embodiment according to the present specification, there is an advantage to data packet exchange in a wireless power system.

4. Changes in Communication Options Between Wireless Power Transmitter and Multiple Wireless Power Receivers Via BLE ISO Channel Meanwhile, when data packets are exchanged between a wireless power transmitter and a wireless power receiver through BLE communication, the exchange form at this time may change. That is, the wireless power transmitter and the wireless power receiver may, for example, exchange data packets based on one of the options described above, and then exchange data packets based on another option.

The change at this time may be performed based on, for example, a change in the channel environment and/or a reduction in power level and/or control latency and/or communication power consumption. That is, in this specification, mode selection for reducing channel environment, power level, control latency, and communication power consumption may be provided.

Here, if the channel environment is good, it may be desirable to send data at wide intervals and remain idle for a long time. Additionally, if the channel environment is poor or the power level is high, it may be desirable to transmit a quick ACK after data transmission. In addition, when the channel environment is poor, it may be desirable to increase power efficiency as a central through integrated ACK.

Accordingly, based on the above points, we will define the criteria for selecting a mode among (Priority transmission and reception of data to wireless power transmitters and/or priority transmission and reception of data to wireless power receivers) Option 1, (Priority transmission and reception of data to wireless power transmitters and/or priority transmission and reception of data to wireless power receivers) Option 2, and (Priority transmission and reception of data to the wireless power transmitter and/or priority transmission and reception of data to the wireless power receiver) Option 3 described above.

As information that may be reflected in the selection criteria, the following factors may be considered.

Channel environment (Packet Error Rate, etc.)

ISO channel and packet transmission interval according to the latency requirements of power control Communication power consumption of wireless power receiver (or wireless power transmitter)

Considering these factors, for example, the following options may be selected.

Option 1 preferred environment (e.g., under conditions where a wireless power transmitter and at least one wireless power receiver exchange data packets based on Option 1):

If the channel environment is good, option 1 can be applied.

Here, as described above, Option 1 supports multiple wireless power receivers transmitting packets within one sub-event. Therefore, when following option 1, the number of sub-events is smaller than when following option 2 or option 3.

Accordingly, in the case of option 1, the number of sub-events is small, so hardware power consumption due to changing sub-events and managing sub-events is small.

Also, when following option 1, the number of sub-events is small, so the transmission delay is shorter than when following option 2 or option 3, which will be described later. Additionally, the transmission interval between packets, which affects control latency, is short. Additionally, spacing between sub-events and between packets (inter frame spacing (IFS)) is smaller than option 2 or option 3.

That is, according to option 1, if the same number of wireless power receivers exist, there may be advantages in terms of transmission delay and/or power consumption compared to other options.

Here, the wireless power transmitter and wireless power receiver can stably exchange multiple data packets within one sub-event when the channel environment is good. In other words, if the channel environment is not good, a communication error may occur when multiple data packets are exchanged within one sub-event.

Accordingly, in this specification, communication based on Option 1 can be supported based on a good channel environment. That is, based on a good channel environment, data packets of the wireless power receiver are transmitted and received at short intervals and the wireless power transmitter and/or at least one wireless power receiver may remain in an idle state for a long time.

Option 2 preferred environment (e.g., under conditions where a wireless power transmitter and at least one wireless power receiver exchange data packets based on Option 2):

Option 2 may be applied if the channel environment is poor or power levels are high. That is, the wireless power transmitter and at least one wireless power receiver may exchange data packets based on option 2 to receive a fast ACK.

Option 3 preferred environment (e.g., under conditions where a wireless power transmitter and at least one wireless power receiver exchange data packets based on Option 3):

If the channel environment is bad, increasing power efficiency as a central unit through integrated ACK can be applied.

Hereinafter, for convenience of understanding, an example in which the wireless power transmitter and/or at least one wireless power receiver changes options will be described with reference to the drawings. In the drawings below, option 3 is assumed to be the default option, but this is only for convenience of understanding. That is, the default option may be, for example. Option 1. Option 2, or Option 2.

Figure 36:
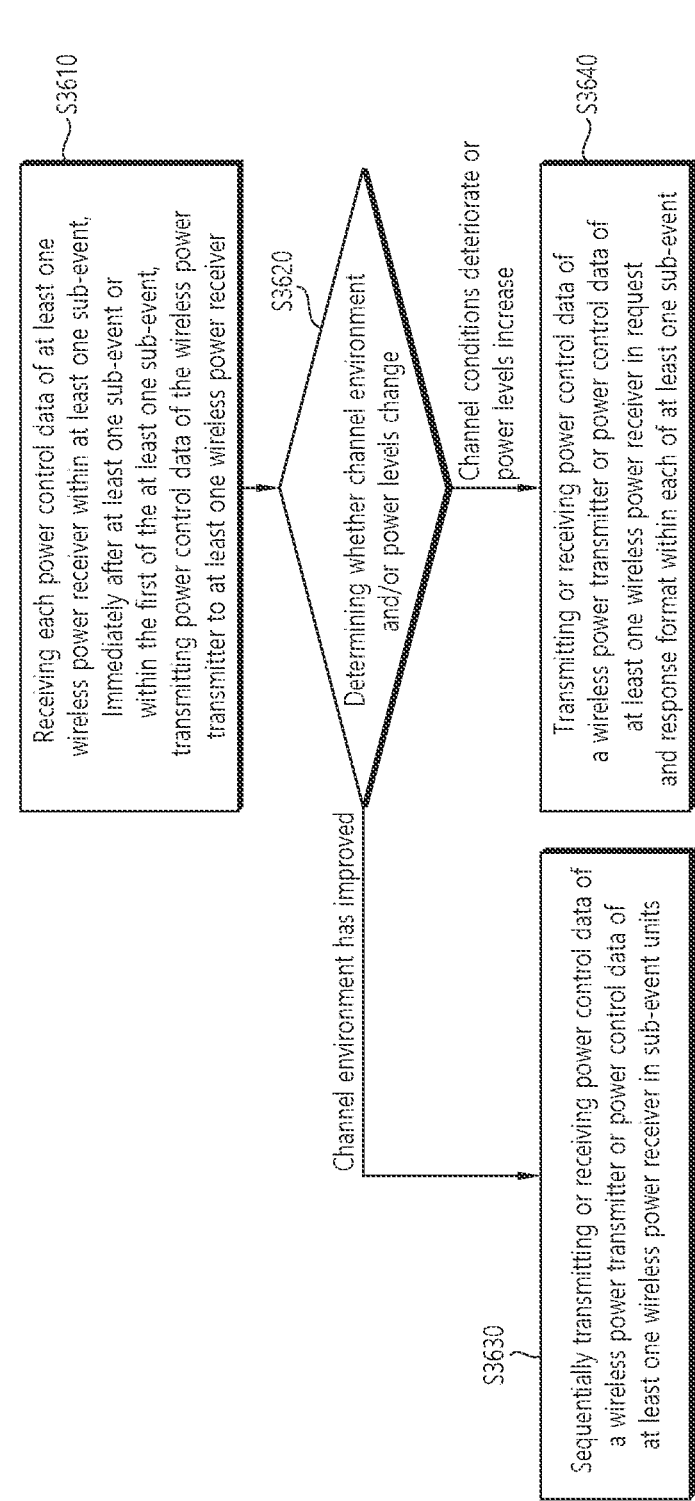
FIG. 36 is a flowchart of an example of changing communication options between a wireless power transmitter and multiple wireless power receivers over a BLE ISO channel.

FIG. 36 is a flowchart of an example of changing communication options between a wireless power transmitter and multiple wireless power receivers over a BLE ISO channel.

According to FIG. 36, the wireless power transmitter receives each power control data of at least one wireless power receiver within at least one sub-event, immediately after at least one sub-event or within the first of the at least one sub-event, it can transmit power control data of the wireless power transmitter to at least one wireless power receiver (S3610).

Afterwards, the wireless power transmitter may determine whether the channel environment and/or power level changes (S3620).

If the channel environment improves, the wireless power transmitter may sequentially transmit or receive power control data of the wireless power transmitter or power control data of at least one wireless power receiver on a sub-event basis (S3630).

On the other hand, if the channel environment worsens or the power level increases, the wireless power transmitter may transmit or receive power control data of the wireless power transmitter or power control data of at least one wireless power receiver in a request and response format within each of at least one sub-event (S3640).

In summary, the reasons for changing between Option 1, Option 2, and Option 3 may be as follows.

For example, if the channel environment deteriorates in option 3, which is the default mode, you can change to option 2.

At this time, the data exchange cycle between the wireless power receiver and the wireless power transmitter can be shortened, which can have the effect of reducing transmission errors on the air.

For example, if the channel environment improves in option 3, which is the default mode, you can change to option 1.

At this time, by reducing the number of switching between Send and Receive modes, the power consumption of the BT chip and delay due to switching can be reduced.

For example, if the power level increases in option 3, which is the default mode, and a faster response is required, it can be changed to option 2.

At this time, the effect of reducing the malfunction time can occur by reducing the control latency. As the power level increases, the power/magnetic field on/off delay after control tends to increase, making control latency an important performance factor.

Meanwhile, in this specification, BLE Extended Advertising (Connectionless Broadcast channel) is utilized, an example in which data packets are exchanged between a wireless power transmitter and/or at least one wireless power receiver may also be provided, to explain this more specifically, it may be as follows.

5. Communication Between a Wireless Power Transmitter and Multiple Wireless Power Receivers Based on BLE Extended Advertising (Connectionless Broadcast Channel)

Figure 37:
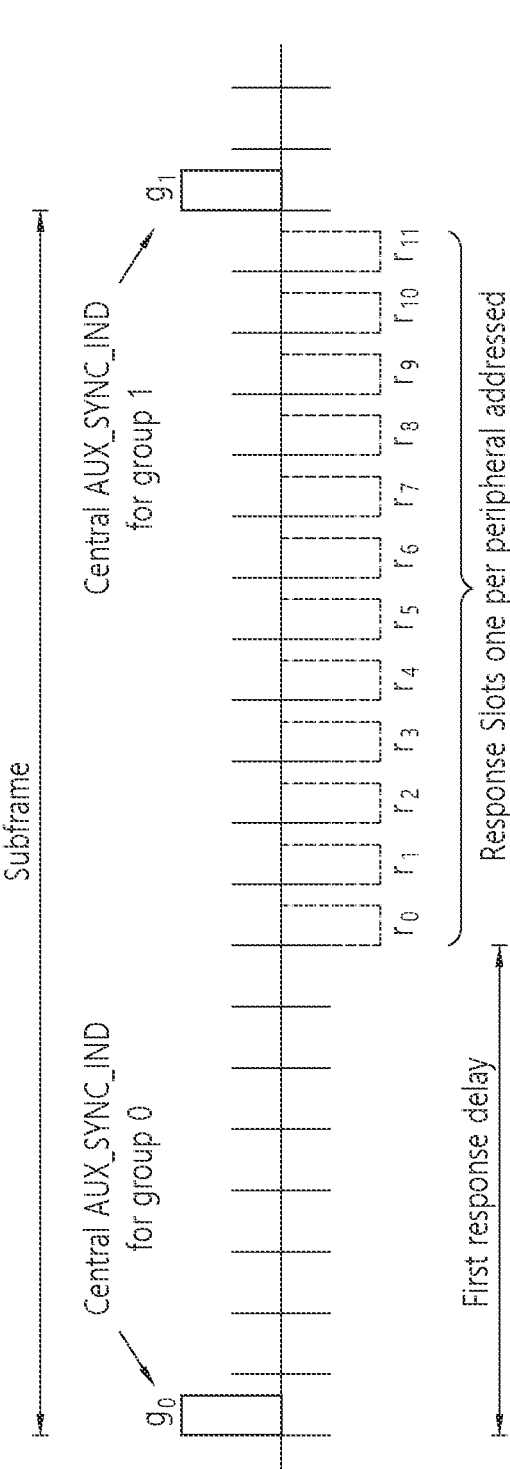
FIG. 37 schematically shows an example of 1:N communication based on BLE advertisement extension.

FIG. 37 schematically shows an example of 1:N communication based on BLE advertisement extension.

According to FIG. 37, after the central device makes a request, multiple peripherals may respond sequentially.

Figure 38:
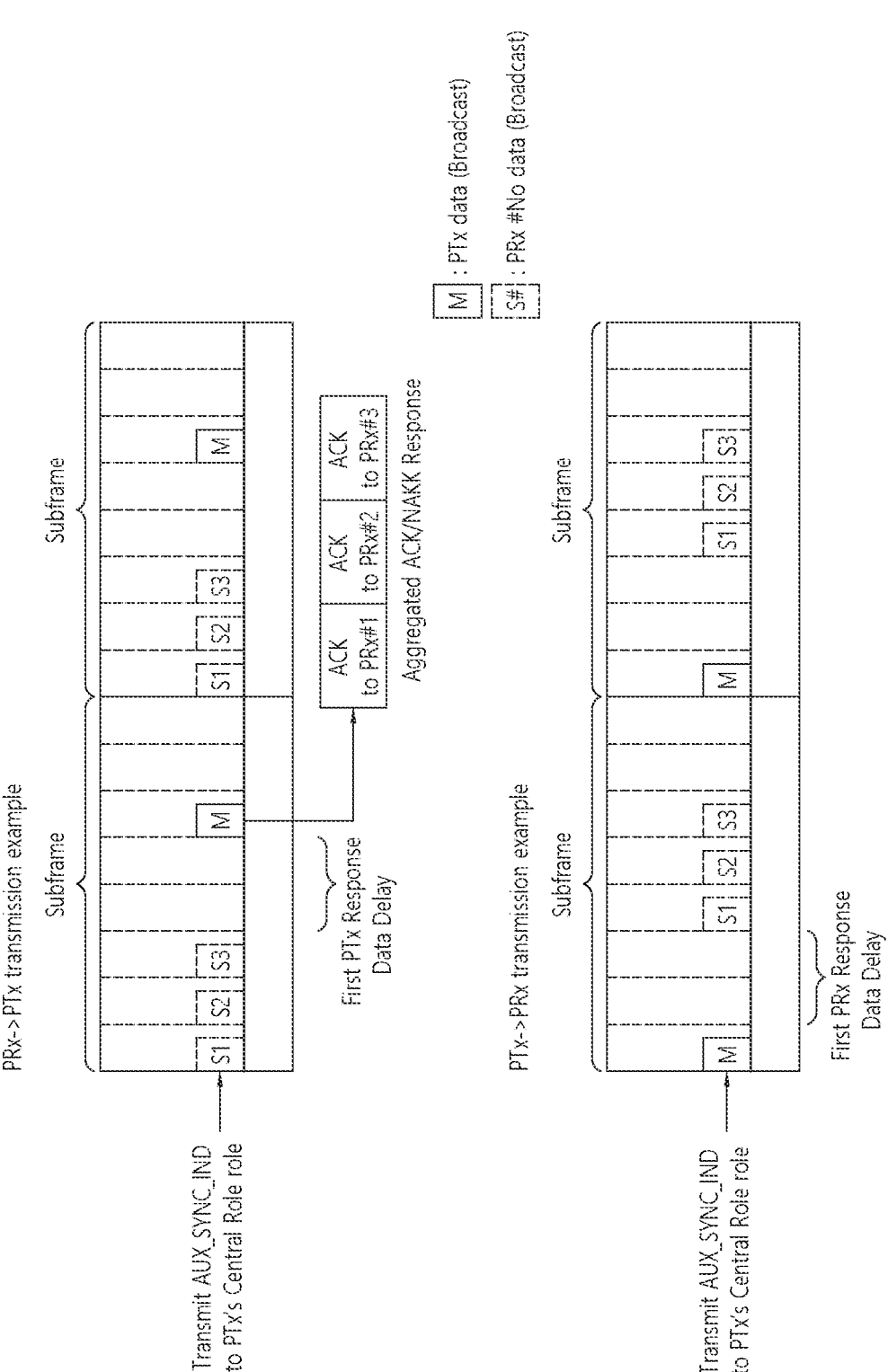
FIG. 38 schematically shows an example of communication between a wireless power transmitter and multiple wireless power receivers based on BLE Extended Advertising (Connectionless Broadcast channel).

FIG. 38 schematically shows an example of communication between a wireless power transmitter and multiple wireless power receivers based on BLE Extended Advertising (Connectionless Broadcast channel).

According to FIG. 38, using BLE Advertising Extension, one wireless power transmission device can transmit request data as a central role. Afterwards, multiple wireless power receivers can sequentially respond to the wireless power transmitter in a peripheral role.

Here, the data format of the wireless power receiver may use a shared-mode packet structure Here, each wireless power receiver can be assigned a slot number and can transmit a message in that slot.

The example in FIG. 38 shows an example in which one response slot is allocated to each wireless power receiver and a message is transmitted. And, as described above, the transmission order at this time may be 1) a method in which the wireless power receiver transmits first and/or 2) a method in which the wireless power transmitter transmits first.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

FIG. 39 is a flowchart of a method for transmitting wireless power performed by a wireless power transmitter according to an embodiment of the present specification.

According to FIG. 39, the wireless power transmitter may receive a configuration packet indicating the availability of OB (out of band) in the configuration phase from at least one wireless power receiver (S3910).

The wireless power transmitter may transmit a capability packet indicating availability of the OB to the at least one wireless power receiver in the negotiation phase (S3920).

The wireless power transmitter may establish a Bluetooth low energy (BLE) connection with the at least one wireless power receiver based on the configuration packet and the capability packet (S3930). Here, the BLE connection may be a connection based on a BLE ISO (isochronous) channel. And, through the BLE connection, the wireless power transmitter can exchange at least one power control data with the at least one wireless power receiver within at least one sub-event included in the interval of the BLE ISO channel.

For example, the wireless power transmitter may sequentially transmit or receive power control data of the wireless power transmitter or power control data of the at least one wireless power receiver on a sub-event basis. At this time, based on a good channel environment, the wireless power transmitter may transmit power control data of the wireless power transmitter and receive power control data of the at least one wireless power receiver.

Also, as an example, the wireless power transmitter may transmit or receive power control data of the wireless power transmitter or power control data of the at least one wireless power receiver in a request and response format within each of the at least one sub-event. At this time, based on whether the channel environment is poor or the power level is high, the wireless power transmitter may transmit power control data of the wireless power transmitter and receive power control data of the at least one wireless power receiver.

In addition, as an example, the wireless power transmitter receives each power control data of the at least one wireless power receiver within each of the at least one sub-event, immediately after the at least one sub-event or within the first of the at least one sub-event, the wireless power transmitter may transmit power control data of the wireless power transmitter to the at least one wireless power receiver.

Here, for example, based on an improvement in the channel environment, the wireless power transmitter may sequentially transmit or receive power control data of the wireless power transmitter or power control data of the at least one wireless power receiver on a sub-event basis. Or, for example, based on deteriorating channel conditions or increasing power levels, the wireless power transmitter may transmit or receive power control data of the wireless power transmitter or power control data of the at least one wireless power receiver in a request and response format within each of the at least one sub-event.

The wireless power transmitter may receive power control data of the at least one wireless power receiver from the at least one wireless power receiver before power control data of the wireless power transmitter.

On the other hand, the wireless power transmitter may transmit power control data of the wireless power transmitter to the at least one wireless power receiver before power control data of the at least one wireless power receiver.

Although not separately shown, a wireless power transmitter may be provided. A wireless power transmitter may include a power converter associated with transmitting wireless power to a wireless power receiver and a communicator/controller associated with communicating with the wireless power receiver and controlling the transmission of the wireless power. The communicator/controller may be configured to receive a configuration packet indicating the availability of OB (out of band) in the configuration phase from at least one wireless power receiver, be configured to transmit a capability packet indicating availability of the OB in the negotiation phase to the at least one wireless power receiver, and be configured to establish a Bluetooth low energy (BLE) connection with the at least one wireless power receiver based on the configuration packet and the capability packet. At this time, the BLE connection is a connection based on the BLE ISO (isochronous) channel, through the BLE connection, the wireless power transmitter can exchange at least one power control data with the at least one wireless power receiver within at least one sub-event included in the interval of the BLE ISO channel.

FIG. 40 is a flowchart of a method of receiving wireless power performed by a wireless power receiver, according to an embodiment of the present specification.

According to FIG. 40, the wireless power receiver may transmit a configuration packet indicating the availability of OB (out of band) in the configuration phase to the wireless power transmitter (S4010).

The wireless power receiver may receive a capability packet indicating availability of the OB in the negotiation phase from the wireless power transmitter (S4020).

The wireless power receiver may establish a Bluetooth low energy (BLE) connection with the wireless power transmitter based on the configuration packet and the capability packet (S4030). Here, the BLE connection is a connection based on the BLE ISO (isochronous) channel, through the BLE connection, the wireless power receiver can exchange at least one power control data with the wireless power transmitter within at least one sub-event included in the interval of the BLE ISO channel.

Although not separately shown, a wireless power receiver may be provided. A wireless power receiver may include a power pickup associated with receiving wireless power from a wireless power transmitter and a communication/controller associated with communicating with the wireless power transmitter and controlling the reception of the wireless power. The communicator/controller may be configured to transmit a configuration packet indicating the availability of OB (out of band) in the configuration phase to the wireless power transmitter, be configured to receive a capability packet indicating availability of the OB in the negotiation phase from the wireless power transmitter, and the configuration packet and be configured to establish a BLE (bluetooth low energy) connection with the wireless power transmitter based on the capability packet. Here, the BLE connection is a connection based on the BLE ISO (isochronous) channel, through the BLE connection, the wireless power receiver can exchange at least one power control data with the wireless power transmitter within at least one sub-event included in the interval of the BLE ISO channel.

So far, the embodiments of this specification have been described. And, according to the above-described embodiments, the following effects may commonly occur.

To explain the effect, the problem situation explained earlier can be summarized as follows.

When a wireless power transmitter performs power control with multiple wireless power receivers, it does not perform power control on multiple wireless power receivers at once, but performs power control with the wireless power receivers one at a time sequentially. Accordingly, a significant delay may occur in power control.

As described above, this specification provides a configuration in which a wireless power receiver performs power control with at least one wireless power receiver at a time through BLE communication. Accordingly, because the wireless power transmitter and/or at least one wireless power receiver according to the present specification can transmit and/or receive a plurality of packets related to power control at once, multiple power control-related packets can be exchanged more quickly.

In particular, this specification utilizes BLE ISO (isochronous) channel-based out-band communication that supports connections at high transmission speeds, a configuration is provided in which a wireless power transmitter performs power control with at least one wireless power receiver at a time.

Here, the minimum inter-packet interval of existing BLE is 7.5 ms, and in products implementing the existing BLE standard, the inter-packet interval corresponds to, for example, 15 ms. In contrast, the minimum sub-event unit of the BLE ISO channel supports 1ms. Accordingly, as described above, the BLE ISO channel provides high data transmission and reception rates (e.g., 2 Mbps) between the wireless power transmitter and/or at least one wireless power receiver, the effect of multiple power control-related packets being quickly transmitted and/or received at once can be maximized.

Additionally, this specification provides a configuration that is adaptive to the channel environment and simultaneously performs power control by varying the aspect of BLE ISO (isochronous) channel-based out-band communication depending on the channel environment.

For example, if the channel environment is good, option 1 may be applied, this can provide the effect that data packets of the wireless power receiver are transmitted and received at short intervals and the wireless power transmitter and/or at least one wireless power receiver can remain in an idle state for a long time.

For example, option 2 may be applied if the channel environment is poor or the power level is high. Through this, a fast ACK can be transmitted and received between the wireless power transmitter and/or wireless power receiver, and accurate data transmission and reception can be provided between the two.

For example, if the channel environment is bad, option 3 may be provided. In other words, power efficiency can be increased as a central through integrated ACK.

In particular, there may also be an effect that optimal transmission and reception of data information can be provided between the wireless power transmitter and/or the wireless power receiver through changes in options depending on the channel environment, etc.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transferring a wireless power in a wireless power transfer system, the method performed by a wireless power transmitter and comprising:

receiving a configuration packet informing availability of out of band (OB) from at least one wireless power receiver in a configuration phase;

transmitting a capability packet informing availability of the OB to the at least one wireless power receiver in a negotiation phase; and establishing a bluetooth low energy (BLE) connection with the at least one wireless power receiver based on the configuration packet and the capability packet, wherein the BLE connection is a connection based on a BLE isochronous (ISO) channel, and wherein, through the BLE connection, the wireless power transmitter exchanges at least one power control data with the at least one wireless power receiver within at least one sub-event included in an interval of the BLE ISO channel.

2. The method of claim 1, wherein the wireless power transmitter sequentially transmits or receives power control data of the wireless power transmitter or power control data of the at least one wireless power receiver on a sub-event unit.

3. The method of claim 2, wherein, based on a good channel environment, the wireless power transmitter transmits the power control data of the wireless power transmitter and receives the power control data of the at least one wireless power receiver.

4. The method of claim 1, wherein the wireless power transmitter transmits or receives power control data of the wireless power transmitter or power control data of the at least one wireless power receiver in a request and response format within each of the at least one sub-event.

5. The method of claim 4, wherein, based on a poor channel environment or high power level, the wireless power transmitter transmits the power control data of the wireless power transmitter and receives the power control data of the at least one wireless power receiver.

6. The method of claim 1, wherein the wireless power transmitter receives each of power control data of the at least one wireless power receiver within each of the at least one sub-event, and wherein, immediately after the at least one sub-event or within a first sub-event of the at least one sub-event, the wireless power transmitter transmits power control data of the wireless power transmitter to the at least one wireless power receiver.

7. The method of claim 6, wherein, based on improvement in a channel environment, the wireless power transmitter sequentially transmits or receives the power control data of the wireless power transmitter or power control data of the at least one wireless power receiver on a sub-event unit, and wherein, based on the channel environment worsening or a power level increasing, the wireless power transmitter transmits or receives the power control data of the wireless power transmitter or the power control data of the at least one wireless power receiver in a request and response format within each of the at least one sub-event.

8. The method of claim 1, wherein the wireless power transmitter receives power control data of the at least one wireless power receiver from the at least one wireless power receiver before power control data of the wireless power transmitter.

9. The method of claim 1, wherein the wireless power transmitter transmits power control data of the wireless power transmitter to the at least one wireless power receiver before power control data of the at least one wireless power receiver.

10. A wireless power transmitter, comprising:

a power converter related to transferring wireless power to a wireless power receiver; and a communicator/controller related to communicating with the wireless power receiver and controlling transfer of the wireless power, wherein the communicator/controller is configured to:

receive a configuration packet informing availability of out of band (OB) from at least one wireless power receiver in a configuration phase;

transmit a capability packet informing availability of the OB to the at least one wireless power receiver in a negotiation phase; and establish a bluetooth low energy (BLE) connection with the at least one wireless power receiver based on the configuration packet and the capability packet, wherein the BLE connection is a connection based on a BLE isochronous (ISO) channel, and wherein, through the BLE connection, the wireless power transmitter exchanges at least one power control data with the at least one wireless power receiver within at least one sub-event included in an interval of the BLE ISO channel.

11. A method for receiving a wireless power in a wireless power transfer system, the method performed by a wireless power receiver and comprising:

transmitting a configuration packet informing availability of out of band (OB) to a wireless power transmitter in a configuration phase;

receiving a capability packet informing availability of the OB from the wireless power transmitter in a negotiation phase; and establishing a bluetooth low energy (BLE) connection with the wireless power transmitter based on the configuration packet and the capability packet, wherein the BLE connection is a connection based on a BLE isochronous (ISO) channel, and wherein, through the BLE connection, the wireless power receiver exchanges at least one power control data with the wireless power transmitter within at least one sub-event included in an interval of the BLE ISO channel.

12. The method of claim 11, wherein the wireless power receiver sequentially transmits or receives power control data of the wireless power transmitter or power control data of the wireless power receiver on a sub-event unit.

13. The method of claim 12, wherein, based on a good channel environment, the wireless power receiver receives the power control data of the wireless power transmitter and transmits the power control data of the wireless power receiver.

14. The method of claim 11, wherein the wireless power receiver transmits or receives power control data of the wireless power transmitter or power control data of the wireless power receiver in a request and response format within each of the at least one sub-event.

15. The method of claim 14, wherein, based on a poor channel environment or high power level, the wireless power receiver receives the power control data of the wireless power transmitter and transmits the power control data of the wireless power receiver.

* * * * *